US012574563B2

(12) United States Patent
Tan et al.

(10) Patent No.: US 12,574,563 B2
(45) Date of Patent: Mar. 10, 2026

(54) IMAGE ENCODING/DECODING METHOD, METHOD OF TRANSMITTING BITSTREAM, AND RECORDING MEDIUM STORING BITSTREAM

(71) Applicant: LG ELECTRONICS INC., Seoul (KR)

(72) Inventors: Hendry Tan, Seoul (KR); Jung Hak Nam, Seoul (KR); Jaehyun Lim, Seoul (KR); Hyeong Moon Jang, Seoul (KR); Seung Hwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/030,043

(22) Filed: Jan. 17, 2025

(65) Prior Publication Data

US 2025/0168411 A1 May 22, 2025

Related U.S. Application Data

(63) Continuation of application No. 18/871,751, filed as application No. PCT/KR2024/004489 on Apr. 5, 2024.

(60) Provisional application No. 63/461,223, filed on Apr. 21, 2023, provisional application No. 63/457,406, filed on Apr. 6, 2023.

(51) Int. Cl.
*H04N 19/80* (2014.01)
*H04N 19/172* (2014.01)
*H04N 19/70* (2014.01)

(52) U.S. Cl.
CPC .......... *H04N 19/80* (2014.11); *H04N 19/172* (2014.11); *H04N 19/70* (2014.11)

(58) Field of Classification Search
CPC ....... H04N 19/80; H04N 19/172; H04N 19/70
See application file for complete search history.

(56) References Cited

U.S. PATENT DOCUMENTS

| | | | | |
|---|---|---|---|---|
| 5,898,820 A * | 4/1999 | Borg | ..................... | H04N 1/4055 |
| | | | | 358/1.9 |
| 2016/0295219 A1* | 10/2016 | Ye | ......................... | H04N 19/147 |
| 2018/0130175 A1* | 5/2018 | Lin | ....................... | H04N 23/698 |
| 2021/0006832 A1* | 1/2021 | Lee | ............................ | G06T 3/06 |
| 2022/0159252 A1* | 5/2022 | Park | ..................... | H04N 19/119 |
| 2022/0329837 A1* | 10/2022 | Li | ........................ | H04N 19/157 |
| 2023/0082583 A1* | 3/2023 | Wang | ................... | H04N 19/184 |
| | | | | 375/240.02 |

(Continued)

*Primary Examiner* — Fabio S Lima
(74) *Attorney, Agent, or Firm* — LEE, HONG, DEGERMAN, KANG & WAIMEY

(57) ABSTRACT

An image encoding/decoding method, a bitstream transmission method, and a computer-readable recording medium for storing a bitstream are provided. The image decoding method according to the present disclosure is an image decoding method performed by an image decoding device, and may be an image decoding method comprising the steps of: obtaining size information from a neural-network post-filter characteristics (NNPFC) supplemental enhancement information (SEI) message; and determining the size of an output picture on the basis of the size information, wherein the size information comprises information on the numerator value of the ratio between the size of the output picture and the size of an input picture and information on the denominator value of the ratio.

12 Claims, 7 Drawing Sheets

(56) References Cited

U.S. PATENT DOCUMENTS

| | | | | |
|---|---|---|---|---|
| 2023/0199223 A1* | 6/2023 | Jhu | ..................... | H04N 19/103 375/240.02 |
| 2023/0421785 A1* | 12/2023 | Chujoh | ............... | H04N 19/182 |
| 2024/0107076 A1* | 3/2024 | Takada | ................. | H04N 19/174 |
| 2024/0223764 A1* | 7/2024 | Wang | .................. | H04N 19/172 |
| 2024/0267527 A1* | 8/2024 | Wang | .................. | H04N 19/513 |
| 2024/0291980 A1* | 8/2024 | Ding | ..................... | H04N 19/70 |
| 2024/0298036 A1* | 9/2024 | Deshpande | ............ | H04N 19/70 |
| 2024/0340414 A1* | 10/2024 | Deshpande | ............ | H04N 19/82 |
| 2024/0340431 A1* | 10/2024 | Cricri | .................. | H04N 19/169 |

* cited by examiner

FIG. 3

IMAGE ENCODING/DECODING METHOD, METHOD OF TRANSMITTING BITSTREAM, AND RECORDING MEDIUM STORING BITSTREAM

CROSS-REFERENCE TO RELATED APPLICATIONS

This application is a continuation of U.S. patent application Ser. No. 18/871,751, filed on Dec. 4, 2024, which is the National Stage filing under 35 U.S.C. 371 of International Application No. PCT/KR2024/004489, filed on Apr. 5, 2024, which the benefit of U.S. Provisional Application No. 63/457,406, filed on Apr. 6, 2023, and 63/461,223, filed on Apr. 21, 2023, the contents of which are all hereby incorporated by reference herein their entirety.

TECHNICAL FIELD

The present disclosure relates to an image encoding/decoding method, a method of transmitting a bitstream and a recording medium storing a bitstream, and, more particularly, to a method of processing information about a size of a picture.

BACKGROUND

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency.

In addition, an object of the present disclosure is to provide a method of signaling size information.

In addition, an object of the present disclosure is to provide a method of determining a size of a picture based on signaled size information.

Another object of the present disclosure is to provide a non-transitory computer-readable recording medium storing a bitstream generated by an image encoding method according to the present disclosure.

Another object of the present disclosure is to provide a non-transitory computer-readable recording medium storing a bitstream received, decoded and used to reconstruct an image by an image decoding apparatus according to the present disclosure.

Another object of the present disclosure is to provide a method of transmitting a bitstream generated by an image encoding method according to the present disclosure.

The technical problems solved by the present disclosure are not limited to the above technical problems and other technical problems which are not described herein will become apparent to those skilled in the art from the following description.

An image decoding method according to an aspect of the present disclosure is performed by an image decoding apparatus. The image decoding method may comprise obtaining size information from a neural-network post-filter characteristics (NNPFC) supplemental enhancement information (SEI) message and determining a size of an output picture based on the size information. The size information may include information about a numerator value of a ratio between the size of the output picture and a size of an input picture and information about a denominator value of the ratio.

An image encoding method according to another aspect of the present disclosure is performed by an image encoding apparatus. The image encoding method may comprise determining a ratio between a size of an output picture and a size of an input picture and encoding size information of the ratio in a neural-network post-filter characteristics (NNPFC) supplemental enhancement information (SEI) message. The size information may include information about a numerator value of the ratio and information about a denominator value of the ratio.

A computer-readable recording medium according to another aspect of the present disclosure can store a bitstream generated by the image encoding method or apparatus of the present disclosure.

A transmission method according to another aspect of the present disclosure may transmit a bitstream generated by the image encoding method or apparatus of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

In addition, according to the present disclosure, size information may be efficiently signaled.

In addition, according to the present disclosure, a size of an output picture may be adaptively determined based on changes in a size of an input picture.

Also, according to the present disclosure, it is possible to provide a non-transitory computer-readable recording medium storing a bitstream generated by an image encoding method according to the present disclosure.

Also, according to the present disclosure, it is possible to provide a non-transitory computer-readable recording medium storing a bitstream received, decoded and used to reconstruct an image by an image decoding apparatus according to the present disclosure.

Also, according to the present disclosure, it is possible to provide a method of transmitting a bitstream generated by an image encoding method according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 3 is a view schematically showing an image decoding apparatus, to which an embodiment of the present disclosure is applicable.

DETAILED DESCRIPTION

Figure 1:
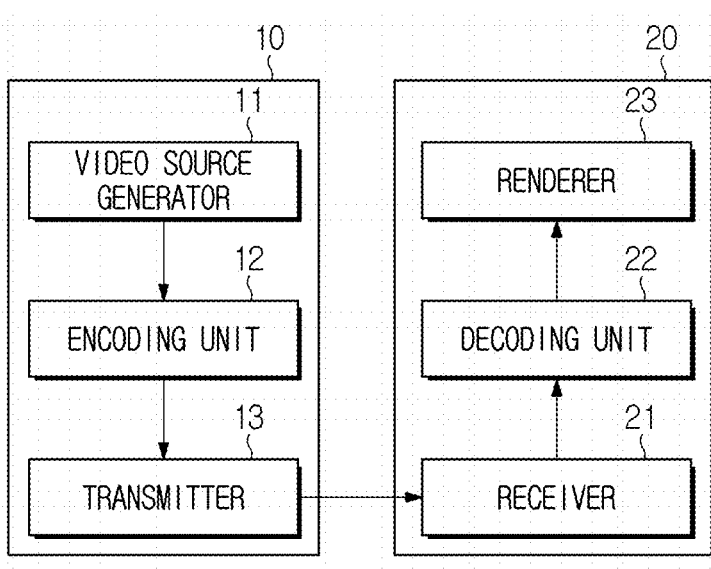
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, "picture" generally means the basis representing one image in a particular time period, and a slice/tile is an encoding basis constituting a part of a picture. One picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma (e.g., Cb, Cr) blocks. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or". For instance, the expression "A/B" and "A, B" may mean "A and/or B." Further, "A/B/C" and "A, B, C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system to which an embodiment of the present disclosure is applicable.

The video coding system according to an embodiment may include an encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit (encoder) 12 and a transmitter 13. The decoding apparatus 20 according to an embodiment may include a receiver 21, a decoding unit (decoder) 22 and a renderer 23. The encoding unit 12 may be called a video/image encoding apparatus, and the decoding unit 22 may be called a video/image decoding apparatus. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may obtain the encoded video/image information or data output in the form of a bitstream and forward it to the receiver 21 of the decoding apparatus 20 or another external object through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The transmitter 13 may be provided as a transmission device separate from the encoding apparatus 12, and in this case, the transmission device may include at least one processor that acquires encoded video/image information or data output in the form of a bitstream and a transmission unit for transmitting it in the form of a file or streaming. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
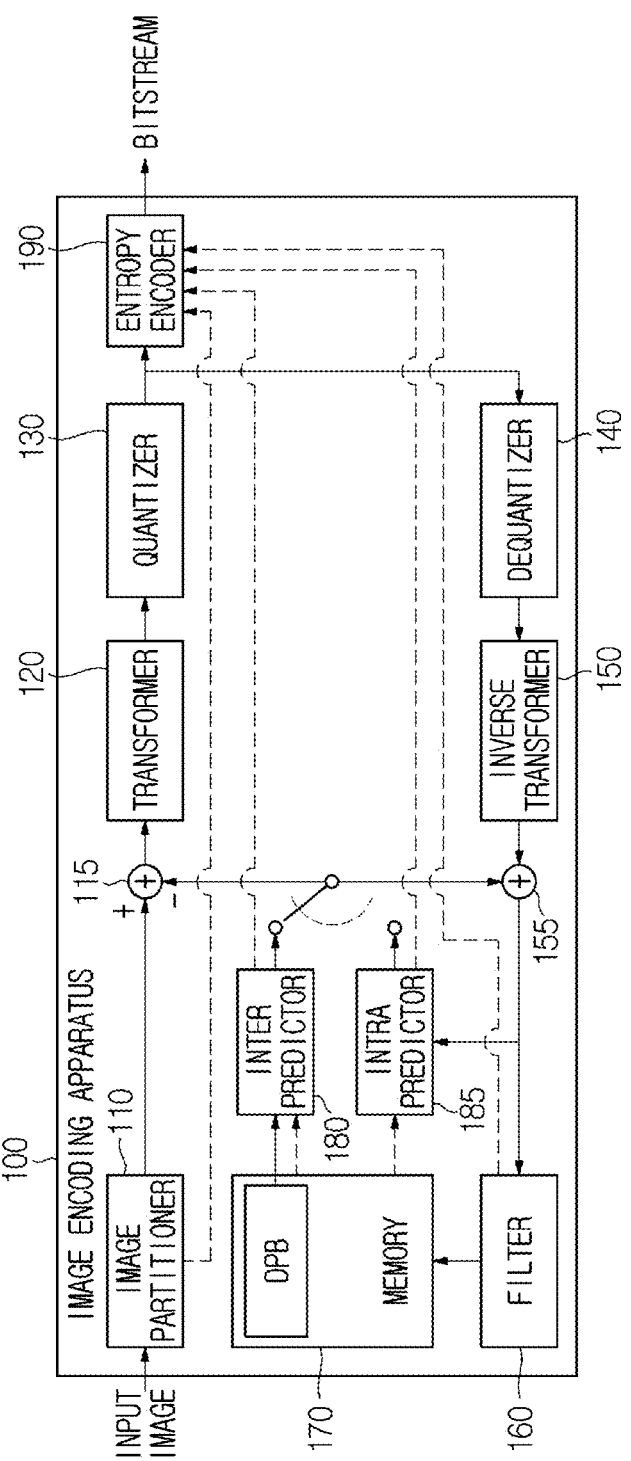
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit (intra predictor) 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit (inter predictor) 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may construct a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
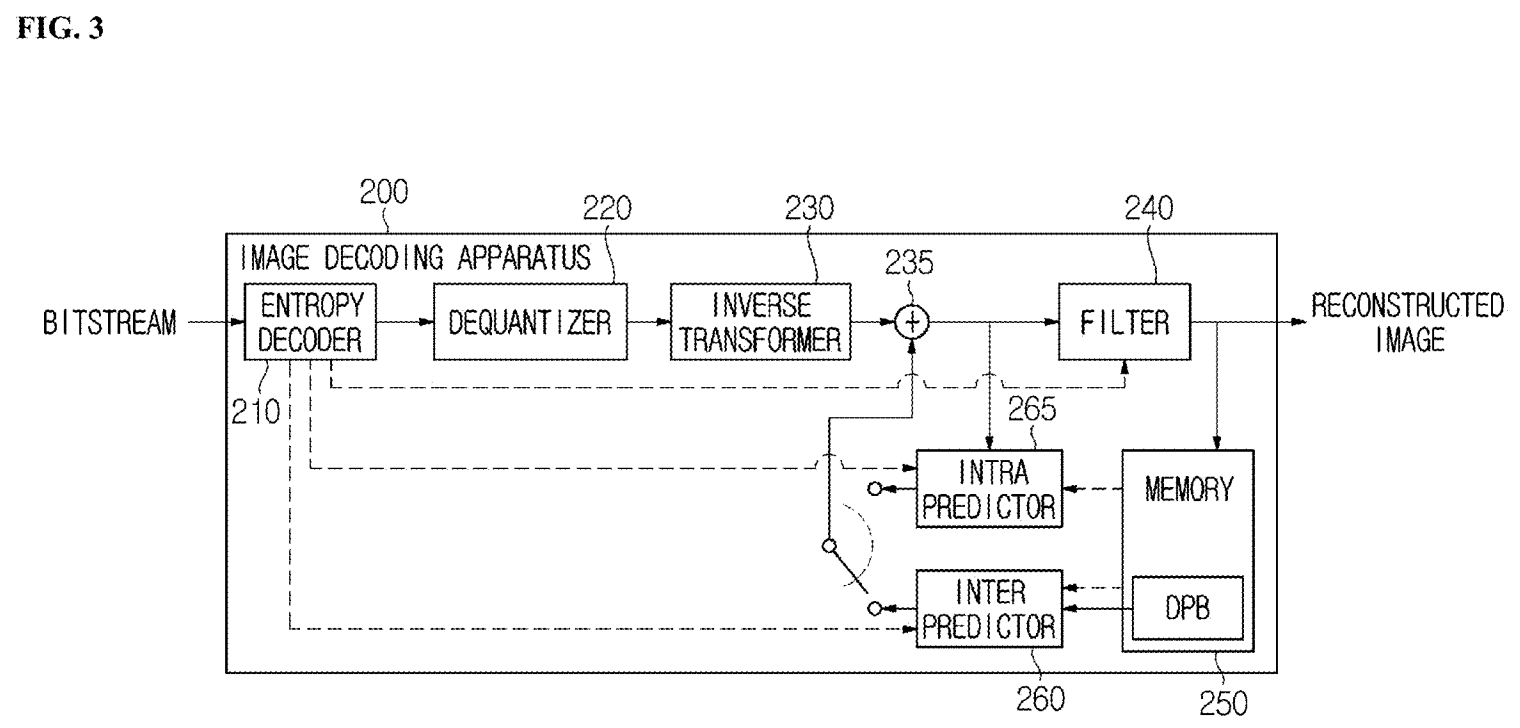

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra prediction unit 265. The inter predictor (inter prediction unit) 260 and the intra predictor (intra prediction unit) 265 may be collectively referred to as a "prediction unit (predictor)". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter predictor 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra predictor 265 may predict the current block by referring to the samples in the current picture. The description of the intra prediction unit 185 is equally applied to the intra prediction unit 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter predictor 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter predictor 260, and the intra predictor 265 of the image decoding apparatus 200.

Neural-Network Post-Filter Characteristics (NNPFC)

A combinations of Tables 1 to 3 represent an NNPFC syntax structure.

TABLE 1

| | Descriptor |
|---|---|
| nn_post_filter_characteristics( payloadSize ) { | |
|   nnpfc_purpose | u(16) |
|   nnpfc_id | ue(v) |
|   nnpfc_base_flag | u(1) |
|   nnpfc_mode_idc | ue(v) |
|   if( nnpfc_mode_idc = = 1 ) { | |
|     while( !byte_aligned( ) ) | |

TABLE 1-continued

| | Descriptor |
|---|---|
| nnpfc_reserved_zero_bit_a | u(1) |
| nnpfc_tag_uri | st(v) |
| nnpfc_uri | st(v) |
| } | |
| nnpfc_property_present_flag | u(1) |
| if( nnpfc_property_present_flag ) { | |
| /* input and output formatting */ | |
| nnpfc_num_input_pics_minus1 | ue(v) |
| if( nnpfc_num_input_pics_minus1 > 0 ) { | |
| for( i= 0; i <= nnpfc_num_input_pics_minus1; i++ ) | |
| nnpfc_input_pic_output_flag[ i ] | u(1) |
| nnpfc_absent_input_pic_zero_flag | u(1) |
| } | |
| if( chromaUpsamplingFlag ) | |
| nnpfc_out_sub_c_flag | u(1) |
| if( colourizationFlag ) | |
| nnpfc_out_colour_format_idc | u(2) |
| if( resolutionResamplingFlag ) { | |
| nnpfc_pic_width_num_minus1 | ue(v) |
| nnpfc_pic_width_denom_minus1 | ue(v) |
| nnpfc_pic_height_num_minus1 | ue(v) |
| nnpfc_pic_height_denom_minus1 | ue(v) |
| } | |
| if( pictureRateUpsamplingFlag ) | |
| for( i = 0; i < nnpfc_num_input_pics_minus1; i++ ) | |
| nnpfc_interpolated_pics[ i ] | ue(v) |
| nnpfc_component_last_flag | u(1) |
| nnpfc_inp_format_idc | ue(v) |
| nnpfc_auxiliary_inp_idc | ue(v) |

TABLE 2

| | |
|---|---|
| nnpfc_inp_order_idc | ue(v) |
| if( nnpfc_inp_format_idc = = 1 ) { | |
| if( nnpfc_inp_order_idc != 1 ) | |
| nnpfc_inp_tensor_luma_bitdepth_minus8 | ue(v) |
| if( nnpfc_inp_order_idc != 0 ) | |
| nnpfc_inp_tensor_chroma_bitdepth_minus8 | ue(v) |
| } | |
| nnpfc_out_format_idc | ue(v) |
| nnpfc_out_order_idc | ue(v) |
| if( nnpfc_out_format_idc = = 1 ) { | |
| if( nnpfc_out_order_idc != 1 ) | |
| nnpfc_out_tensor_luma_bitdepth_minus8 | ue(v) |
| if( nnpfc_out_order_idc != 0 ) | |
| nnpfc_out_tensor_chroma_bitdepth_minus8 | ue(v) |
| } | |
| nnpfc_separate_colour_description_present_flag | u(1) |
| if( nnpfc_separate_colour_description_present_flag ) { | |
| nnpfc_colour_primaries | u(8) |
| nnpfc_transfer_characteristics | u(8) |
| if( nnpfc_out_format_idc = = 1 ) { | |
| nnpfc_matrix_coeffs | u(8) |
| nnpfc_full_range_flag | u(1) |
| } | |
| } | |
| nnpfc_chroma_loc_info_present_flag | u(1) |
| if( nnpfc_chroma_loc_info_present_flag ) | |
| nnpfc_chroma_sample_loc_type_frame | ue(v) |
| nnpfc_overlap | ue(v) |
| nnpfc_constant_patch_size_flag | u(1) |
| if( nnpfc_constant_patch_size_flag ) { | |
| nnpfc_patch_width_minus1 | ue(v) |
| nnpfc_patch_height_minus1 | ue(v) |
| } else { | |
| nnpfc_extended_patch_width_cd_delta_minus1 | ue(v) |
| nnpfc_extended_patch_height_cd_delta_minus1 | ue(v) |
| } | |

TABLE 3

| | |
|---|---|
| nnpfc_padding_type | ue(v) |
| if( nnpfc_padding_type = = 4 ) { | |
| if( nnpfc_inp_order_idc != 1 ) | |
| nnpfc_luma_padding_val | ue(v) |
| if( nnpfc_inp_order_idc != 0 ) { | |
| nnpfc_cb_padding_val | ue(v) |
| nnpfc_cr_padding_val | ue(v) |
| } | |
| } | |
| nnpfc_complexity_info_present_flag | u(1) |
| if( nnpfc_complexity_info_present_flag ) { | |
| nnpfc_parameter_type_idc | u(2) |
| if( nnpfc_parameter_type_idc != 2 ) | |
| nnpfc_log2_parameter_bit_length_minus3 | u(2) |
| nnpfc_num_parameters_idc | u(6) |
| nnpfc_num_kmac_operations_idc | ue(v) |
| nnpfc_total_kilobyte size | ue(v) |
| } | |
| nnpfc_metadata_extension_num_bits | ue(v) |
| if( npfc_metadata_extension_num_bits > 0 ) | |
| nnpfc_reserved_metadata extension | u(v) |
| } | |
| /* ISO/IEC 15938-17 bitstream */ | |
| if( nnpfc_mode_idc = = 0 ) { | |
| while( !byte_aligned( ) ) | |
| nnpfc_reserved_zero_bit_b | u(1) |
| for( i = 0; more_data_in_payload( ); i++ ) | |
| nnpfc_payload_byte[ i ] | b(8) |
| } | |
| } | |

The NNPFC syntax structures of Tables 1 to 3 may be signaled in the form of a supplemental enhancement information (SEI) message. An SEI message signaling the NNPFC syntax structures of Tables 1 to 3 may be referred to as an NNPFC SEI message.

The neural-network post-filter characteristics (NNPFC) SEI message specifies a neural network that may be used as a post-processing filter. The use of specified neural-network post-processing filters (NNPFs) for specific pictures is indicated with neural-network post-filter activation (NNPFA) SEI messages. Here, "post-processing filter" and "post filter" may have the same meaning.

Use of this SEI message requires the definition of the following variables:

Input picture width and height in units of luma samples, denoted herein by CroppedWidth and CroppedHeight, respectively.

Luma sample array CroppedYPic [idx] and chroma sample arrays CroppedCbPic [idx] and CroppedCrPic [idx], when present, of the input pictures with index idx in the range of 0 to numInputPics-1, inclusive, that are used as input for the NNPF.

BitDepthy may represent a bit depth for the luma sample array of the input pictures.

BitDepthc may represent a bit depth of the chroma sample arrays of the input pictures (if any).

ChromaFormatIdc may represent a chroma format identifier.

When the value of nnpfc_auxiliary_inp_idc is equal to 1, a filtering strength control value StrengthControlVal shall be a real number in the range of 0 to 1, inclusive.

Input picture with index 0 may correspond to the picture for which the NNPF defined by this NNPFC SEI message is activated by an NNPFA SEI message. Input picture with index i in the range of 1 to numInputPics-1, inclusive, may precede the input picture with index i−1 in output order.

If nnpfc_purpose & 0x08 is not equal to 0 and an input picture with index 0 is associated with a frame packing arrangement SEI message with fp_arrangement_type equal to 5, then all input pictures may be associated with frame packing arrangement SEI messages with fp_arrangement_type equal to 5 and have the same value as fp_current_frame_is_frame0_flag.

There may be more than one NNPFC SEI message for the same picture. If more than one NNPFC SEI message with different nnpfc_id values is present or is active for the same picture, the more than one NNPFC SEI message may have the same or different nnpfc_purpose and nnpfc_mode_idc values.

nnpfc_purpose indicates the purpose of the NNPF as specified in Table 4. The value of nnpfc_purpose shall be in the range of 0 to 63, inclusive, in bitstreams. Values of 64 to 65 535, inclusive, for nnpfc_purpose are reserved for future use. Decoders shall ignore NNPFC SEI messages with nnpfc_purpose in the range of 64 to 65 535, inclusive. If the value of nnpfc_purpose is reserved for future use, the syntax elements of this SEI message may be extended to syntax elements that exist provided that nnpfc_purpose is equal to the corresponding value. If ChromaFormatIde is equal to 3, nnpfc_purpose & 0x02 shall be equal to 0. If ChromaFormatIde or nnpfc_purpose & 0x02 is not equal to 0, nnpfc_purpose & 0x20 shall be equal to 0.

TABLE 4

| Value | Interpretation |
|---|---|
| nnpfc_purpose = = 0 | May be used as determined by the application |
| nnpfc purpose > 0 && ( nnpfc purpose & 0x01 ) = = 0 | No general visual quality improvement |
| ( nnpfc purpose & 0x01 ) != 0 | With general visual quality improvement |
| nnpfc purpose > 0 && ( nnpfc purpose & 0x02 ) = = 0 | No chroma upsampling (from the 4:2:0 chroma format to the 4:2:2 or 4:4:4 chroma format, or from the 4:2:2 chroma format to the 4:4:4 chroma format) |
| ( nnpfc purpose & 0x02 ) != 0 | With chroma upsampling |
| napfc purpose > 0 && ( nnpfc purpose & 0x04 ) = = 0 | No resolution upsampling (increasing the width or height) |
| ( nnpfc purpose & 0x04 ) != 0 | With resolution upsampling |
| nnpfc purpose > 0 && ( nnpfc purpose & 0x08 ) = = 0 | No picture rate upsampling |
| ( nnpfc purpose & 0x08 ) != 0 | With picture rate upsampling |
| nnpfc purpose > 0 && ( nnpfc purpose & 0x10) = = 0 | No bit depth upsampling (increasing the luma bit depth or the chroma bit depth) |
| ( nnpfc purpose & 0x10 ) != 0 | With bit depth upsampling |
| nnpfc purpose > 0 && ( nnpfc purpose & 0x20 ) = = 0 | No colourization (from the 4:0:0 chroma format to the 4:2:0, 4:2:2, or 4:4:4 chroma format) |
| ( nnpfc purpose & 0x20 ) != 0 | With colourization | nnpfc_id may contain an identifying number that may be used to identify an NNPF. The value of nnpfc_id shall be in the range of 0 to $2^{32}-2$, inclusive. Values of nnpfc_id from 256 to 511, inclusive, and from $2^{31}$ to $2^{32}-2$, inclusive, may be reserved for future use. Decoders encountering an NNPFC SEI message with nnpfc_id in the range of 256 to 511, inclusive, or in the range of $2^{31}$ to $2^{32}-2$, inclusive, shall ignore the SEI message.

When an NNPFC SEI message is the first NNPFC SEI message, in decoding order, that has a particular nnpfc_id value within the current CLVS, the following applies:

This SEI message specifies a base NNPF.

This SEI message pertains to the current decoded picture and all subsequent decoded pictures of the current layer, in output order, until the end of the current CLVS.

The NNPFC SEI message may be a repetition of a previous NNPFC SEI message within the current CLVS in decoding order, and subsequent semantics may apply as if this SEI message were the only NNPFC SEI message with identical content within the current CLVS.

nnpfc_mode_idc equal to 0 may indicate that the SEI message may contain a bitstream representing the base NNPF, or may represent an update relative to the base NNPF with the same nnpfc_id value.

When the NNPFC SEI message is the first NNPFC SEI message, in decoding order, that has a particular nnpfc_id value within the current CLVS, nnpfc_mode_idc equal to 1 may specify that the base NNPF associated with the nnpfc_id value is a neural network, and the neural network may be a neural network identified by a URI denoted by nnpfc_uri using a format identified by a tag URI nnpfc_tag_uri.

If the NNPFC SEI message is neither the first NNPFC SEI message, in decoding order, that has a particular nnpfc_id value within the current CLVS nor a repetition of the first NNPFC SEI message, nnpfc_mode_idc equal to 1 may specify that an update relative to the base NNPF with the same nnpfc_id value are defined by a URI denoted by nnpfc_uri using a format identified by a tag URI nnpfc_tag_uri.

The value of nnpfc_mode_idc shall be in the range of 0 to 1, inclusive, in bitstreams. Values of 2 to 255, inclusive, for nnpfc_mode_idc may reserved for future use and may not be present in bitstreams. Decoders shall ignore NNPFC SEI messages with nnpfc_mode_idc in the range of 2 to 255, inclusive. Values of nnpfc_mode_idc greater than 255 are not present in bitstreams and may not be reserved for future use.

If the SEI message is the first NNPFC SEI message in decoding order with a particular nnpfc_id value within the current CLVS, the NNPF PostProcessingFilter ( ) may be assigned the same as the base NNPF.

If the SEI message is not the first NNPFC SEI message in decoding order with a particular nnpfc_id value within the current CLVS and is not a repeat of the first NNPFC SEI message, the NNPF PostProcessingFilter ( ) may be obtained by applying the update defined by the SEI message to the base NNPF.

Updates are not cumulative; rather, each update is applied to the base NNPF, which is the NNPF specified by the first NNPFC SEI message in decoding order with a particular nnpfc_id value within the current CLVS.

nnpfc_reserved_zero_bit_a shall be equal to 0 in bitstreams. Decoders shall ignore NNPFC SEI messages in which nnpfc_reserved_zero_bit_a is not equal to 0.

nnpfc_tag_uri may contain a tag URI with syntax and semantics as specified in IETF RFC 4151 identifying the neural network used as a base NNPF or an update relative to the base NNPF with the same nnpfc_id value specified by nnpfc_uri. nnpfc_tag_uri enables uniquely identifying the format of neural network data specified by nnrpf_uri without needing a central registration authority. nnpfc_tag_uri equal to "tag: iso.org,2023:15938-17" may indicate that the neural network data identified by nnpfc_uri conforms to ISO/IEC 15938-17.

nnpfc_uri may contain a URI with syntax and semantics as specified in IETF Internet Standard 66 identifying the neural network used as a base NNPF or an update relative to the base NNPF with the same nnpfc_id value.

nnpfc_property_present_flag equal to 1 may specify that syntax elements related to the filter purpose, input formatting, output formatting, and complexity are present. nnpfc_property_present_flag equal to 0 may specify that no syntax elements related to the filter purpose, input formatting, output formatting, and complexity are present. If the SEI message is the first NNPFC SEI message in decoding order and has a particular nnpfc_id value within the current CLVS, the value of nnpfc_property_present_flag shall be equal to 1. If the value of nnpfc_property_present_flag is equal to 0, then all syntax elements that are present only when the value of nnpfc_property_present_flag is 1 and for which no inferred value has been specified may be inferred to be equal to the corresponding syntax elements in the NNPFC SEI message that contains the base NNPF for which the SEI provides updates.

nnpfc_base_flag equal to 1 may indicate that the SEI message represents a base NNPF. A value of nnpfc_base_flag equal to 0 may indicate that the SEI message represents an update related to the base NNPF. If nnpfc_base_flag is not present, the value of nnpfc_base_flag may be inferred to be 0.

The following constraints apply to the value of nnpfc_base_flag:

When an NNPFC SEI message is the first NNPFC SEI message, in decoding order, that has a particular nnpfc_id value within the current CLVS, the value of nnpfc_base_flag shall be equal to 1.

When an NNPFC SEI message nnpfcB is not the first NNPFC SEI message, in decoding order, that has a particular nnpfc_id value within the current CLVS and the value of nnpfc_base_flag is equal to 1, the NNPFC SEI message shall be a repetition of the first NNPFC SEI message nnpfcA with the same nnpfc_id value, in decoding order, i.e., the payload content of nnpfcB shall be the same as that of nnpfcA.

If the NNPFC SEI message is not the first NNPFC SEI message with a particular nnpfc_id value within the current CLVS in decoding order and is not a repetition of the first NNPFC SEI message with a particular nnpfc_id value, the following may be applied:

SEI messages may define updates relative to the base NNPF that precedes them in decoding order, with the same nnpfc_id value.

SEI messages are associated only with the current reconstructed picture of the current layer and all subsequent reconstructed pictures in output order, up to the end of the current CLVS or the next reconstructed picture within the current CLVS, and are associated with subsequent NNPFC SEI messages having the earlier value among specific nnpfc_id values within the current CLVS in decoding order.

When an NNPFC SEI message nnpfcCurr is not the first NNPFC SEI message, in decoding order, that has a particular nnpfc_id value within the current CLVS, is not a repetition of the first NNPFC SEI message with that particular nnpfc_id (i.e., the value of nnpfc_base_flag is equal to 0), and the value of nnpfc_property_present_flag is equal to 1, the following constraints apply:

The value of nnpfc_purpose in the NNPFC SEI message shall be the same as the value of nnpfc_purpose in the first NNPFC SEI message, in decoding order, that has that particular nnpfc_id value within the current CLVS.

The values of syntax elements following nnpfc_property_present_flag and preceding nnpfc_complexity_info_present_flag, in decoding order, in the NNPFC SEI message shall be the same as the values of corresponding syntax elements in the first NNPFC SEI message, in decoding order, that has that particular nnpfc_id value within the current CLVS.

Either nnpfc_complexity_info_present_flag shall be equal to 0 or both nnpfc_complexity_info_present_flag shall be equal to 1 in the first NNPFC SEI message, in decoding order, that has that particular nnpfc_id value within the current CLVS and all the following apply:

(1) nnpfc_parameter_type_idc in nnpfcCurr shall be equal to nnpfc_parameter_type_idc in nnpfcBasc.

(2) nnpfc_log 2_parameter_bit_length_minus3 in nnpfcCurr, when present, shall be less than or equal to nnpfc_log 2_parameter_bit_length_minus3 in nnpfcBase.

(3) If nnpfc_num_parameters_idc in nnpfcBase is equal to 0, nnpfc_num_parameters_idc in nnpfcCurr shall be equal to 0.

(4) Otherwise (nnpfc_num_parameters_idc in nnpfcBase is greater than 0), nnpfc_num_parameters_idc in nnpfcCurr shall be greater than 0 and less than or equal to nnpfc_num_parameters_idc in nnpfcBase.

(5) If nnpfc_num_kmac_operations_idc in nnpfcBase is equal to 0, nnpfc_num_kmac_operations_idc in nnpfcCurr shall be equal to 0.

(6) Otherwise (nnpfc_num_kmac_operations_idc in nnpfcBase is greater than 0), nnpfc_num_kmac_operations_idc in nnpfcCurr shall be greater than 0 and less than or equal to nnpfc_num_kmac_operations_idc in nnpfcBase.

(7) If nnpfc_total_kilobyte_size in nnpfcBase is equal to 0, nnpfc_total_kilobyte_size in nnpfcCurr shall be equal to 0.

(8) Otherwise (nnpfc_total_kilobyte_size in nnpfcBase is greater than 0), nnpfc_total_kilobyte_size in nnpfcCurr shall be greater than 0 and less than or equal to nnpfc_total_kilobyte_size in nnpfcBasc.

nnpfc_out_sub_c_flag may specify the values of the variables outSubWidthC and outSubHeightC when nnpfc_purpose & 0x02 is not equal to 0. nnpfc_out_sub_c_flag equal to 1 may specify that outSubWidthC is equal to 1 and outSubHeightC is equal to 1. nnpfc_out_sub_c_flag equal to 0 may specify that outSubWidthC is equal to 2 and outSubHeightC is equal to 1. When ChromaFormatIde is equal to 2 and nnpfc_out_sub_c_flag is present, the value of nnpfc_out_sub_c_flag shall be equal to 1.

nnpfc_out_colour_format_idc, when nnpfc_purpose & 0x20 is not equal to 0, may specify the colour format of the NNPFC output and consequently the values of the variables outSubWidthC and outSubHeightC. nnpfc_out_colour_format_idc equal to 1 may specify that the colour format of the NNPFC output is the 4:2:0 format and outSubWidthC and outSubHeightC are both equal to 2. nnpfc_out_colour_format_idc equal to 2 may specify that the colour format of the NNPFC output is the 4:2:2 format and outSubWidthC is equal to 2 and outSubHeightC is equal to 1. nnpfc_out_colour_format_idc equal to 3 may specify that the colour format of the NNPFC output is the 4:2:4 format and outSubWidthC and outSubHeightC are both equal to 1. The value of nnpfc_out_colour_format_idc shall not be equal to 0.

When nnpfc_purpose & 0x02 and nnpfc_purpose & 0x20 are both equal to 0, outSubWidthC and outSubHeightC may be inferred to be equal to SubWidthC and SubHeightC, respectively.

nnpfc_pic_width_in_luma_samples and nnpfc_pic_height_in_luma_samples may represent the width and height, respectively, of the luma sample array of the picture resulting from applying the NNPF identified by nnpfc_id to the cropped decoded output picture. If nnpfc_pic_width_in_luma_samples and nnpfc_pic_height_in_luma_samples are not present, they may be inferred to be equal to Cropped-Width and CroppedHeight, respectively. The value of nnpfc_pic_width_in_luma_samples shall be in the range of CroppedWidth to CroppedWidth*16-1, inclusive. The value of nnpfc_pic_height_in_luma_samples shall be in the range of CroppedHeight to CroppedHeight*16-1, inclusive.

nnpfc_num_input_pics_minus1+1 may represent the number of decoded output pictures used as input to NNPF. The value of nnpfc_num_input_pics_minus1 shall be in the range of 0 to 63, inclusive.

nnpfc_interpolated_pics[i] may specify the number of interpolated pictures generated by the NNPF between the i-th and the (i+1)-th picture used as input for the NNPF. The value of nnpfc_interpolated_pics[i] shall be in the range of 0 to 63, inclusive. The value of nnpfc_interpolated_pics[i] shall be greater than 0 for at least one value of i in the range of 0 to nnpfc_num_input_pics_minus1-1, inclusive.

nnpfc_input_pic_output_flag [i] equal to 1 may indicate that for the i-th input picture the NNPF generates a corresponding output picture. nnpfc_input_pic_output_flag [i] equal to 0 may indicate that for the i-th input picture the NNPF does not generate a corresponding output picture.

The variable numInputPics, which indicates the number of pictures used as input to NNPF, and the variable numOutputPics, which indicates the total number of pictures generated as a result of NNPF, may be derived as shown in Table 5.

in the input tensor, including four luma matrices, two chroma matrices, and one auxiliary input matrix. In this case, the process DeriveInputTensors( ) would derive each of these 7 channels of the input tensor one by one, and when a particular channel of these channels is processed, that channel may be referred to as the current channel during the process.

nnpfc_inp_format_idc may indicate the method of converting a sample value of the cropped decoded output picture into an input value to the NNPF. When nnpfc_inp_format_idc is equal to 0, the input values to the NNPF are real numbers and the functions InpY( ) and InpC( ) may be specified as shown in Equation 1.

$$InpY(x) = x \div ((1 \ll BitDepth_Y) - 1) \qquad \text{[Equation 1]}$$

$$InpC(x) = x \div ((1 \ll BitDepth_C) - 1)$$

When nnpfc_inp_format_idc is equal to 1, the input values to the NNPF are unsigned integer numbers and the functions InpY( ) and InpC( ) are specified as shown in Table 6.

TABLE 6

```
shiftY = BitDepthY - inpTensorBitDepthY
if( inpTensorBitDepthY >= BitDepthY)
    InpY( x ) = x << ( inpTensorBitDepthY - BitDepthY )
else
    InpY( x ) = Clip3(0, ( 1 << inpTensorBitDepthY ) - 1, ( x + ( 1 << ( shiftY - 1 ) ) ) ) >> shif
shiftC = BitDepthC - inpTensorBitDepthC
if( inpTensorBitDepthC >= BitDepthC )
    InpC( x ) = x << ( inpTensorBitDepthC - BitDepthC )
else
    InpC( x ) = Clip3(0, ( 1 << inpTensorBitDepthC ) - 1, ( x + ( 1 << ( shiftC - 1 ) ) ) ) >> shif
```

TABLE 5

```
for( i = 0, numOutputPics = 0; i < numInputPics; i++ )
    if( nnpfc_input_pic_output_flag[ i ] ) {
        InpIdx[ numOutputPics ] = i
        numOutputPics++
    }
NumInpPicsInOutputTensor = numOutputPics
if( pictureRateUpsamplingFlag )
    for( i = 0; i <= numInputPics − 2; i++ )
        numOutputPics += nnpfc_interpolated_pics[ i
``` nnpfc_component_last_flag equal to 1 may indicate that the last dimension in the input tensor inputTensor to the NNPF and the output tensor outputTensor resulting from the NNPF is used for a current channel. nnpfc_component_last_flag equal to 0 may indicate that the third dimension in the input tensor inputTensor to the NNPF and the output tensor outputTensor resulting from the NNPF is used for a current channel.

The first dimension in the input tensor and in the output tensor may be used for the batch index, which is a practice in some neural network frameworks. While formulae in the semantics of this SEI message use the batch size corresponding to the batch index equal to 0, it is up to the post-processing implementation to determine the batch size used as input to the neural network inference.

For example, when nnpfc_inp_order_idc is equal to 3 and nnpfc_auxiliary_inp_idc is equal to 1, there are 7 channels The variable inpTensorBitDepthy may be derived from the syntax element nnpfc_inp_tensor_luma_bitdepth_minus8 as specified below. The variable inpTensorBitDepthc may be derived from the syntax element nnpfc_inp_tensor_chroma_bitdepth_minus8 as specified below.

Values of nnpfc_inp_format_idc greater than 1 may be reserved for future use and may not be present in the bitstream. Decoders must ignore NNPFC SEI messages containing reserved values of nnpfc_inp_format_idc.

nnpfc_inp_tensor_luma_bitdepth_minus8+8 may specify the bit depth of luma sample values in the input integer tensor. The value of inpTensorBitDepthy is derived as shown in Equation 2.

$$inpTensorBitDepth_Y = \qquad \text{[Equation 2]}$$

$$nnpfc\_inp\_tensor\_luma\_bitdepth\_minus8 + 8$$

It is a requirement bitstream conformance that the value of nnpfc_inp_tensor_luma_bitdepth_minus8 shall be in the range of 0 to 24, inclusive.

nnpfc_inp_tensor_chroma_bitdepth_minus8+8 may specify the bit depth of chroma sample values in the input integer tensor. The value of inpTensorBitDepthc may be derived as shown in Equation 3.

$$inpTensorBitDepth_C = \qquad \text{[Equation 3]}$$
$$nnpfc\_inp\_tensor\_chroma\_bitdepth\_minus8 + 8$$

It is a requirement of bitstream conformance that the value of nnpfc_inp_tensor_chroma_bitdepth_minus8 shall be in the range of 0 to 24, inclusive.

nnpfc_inp_order_idc may indicate a method of ordering the sample array of the cropped decoded output picture to one of the input pictures to NNPF.

The value of nnpfc_inp_order_idc shall be in the range of 0 to 3, inclusive, in bitstreams. Values of 4 to 255, inclusive, for nnpfc_inp_order_idc shall not be present in bitstreams. Decoders shall ignore NNPFC SEI messages with nnpfc_inp_order_idc in the range of 4 to 255, inclusive. Values of nnpfc_inp_order_idc greater than 255 shall not be present in bitstreams and are not reserved for future use.

When ChromaFormatIdc is not equal to 1, the value of nnpfc_inp_order_idc shall not be 3.

Table 7 shows an informative description of nnpfc_inp_order_idc values.

TABLE 7

Figure 4:
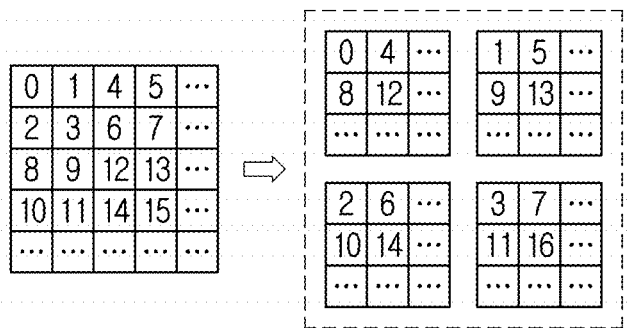
FIG. 4 is a view showing an interleaved method for derivation of a luma channel.

| nnpfc_inp_order_idc | Description |
|---|---|
| 0 | When nnpfc_auxiliary_inp_idc is equal to 0, one luma matrix may be present in the input tensor to each input picture and the number of channels may be 1. When nnpfc_auxiliary_inp_idc is equal to 1, one luma matrix and one auxiliary input matrix may be present and the number of channels may be 2. |
| 1 | When nnpfc_auxiliary_inp_idc is equal to 0, two chroma matrices may be present in the input tensor and the number of channels may be 2. When nnpfc_auxiliary_inp_idc is equal to 1, two chroma matrices and one auxiliary input matrix may be present and the number of channels may be 3. |
| 2 | When nnpfc_auxiliary_inp_idc is equal to 0, one luma matrix and two chroma matrices may be present in the input tensor and the number of channels may be 3. When nnpfc_auxiliary_inp_idc is equal to 1, one luma matrix, two chroma matrices and one auxiliary input matrix may be present and the number of channels may be 4. |
| 3 | When nnpfc_auxiliary_inp_idc is equal to 0, four luma matrices and two chroma matrices may be present in the input tensor and the number of channels may be 6. When nnpfc_auxiliary_inp_idc is equal to 1, four luma matrices, two chroma matrices and one auxiliary input matrix may be present and the number of channels may be 7. The luma channel may be derived using an interleaved method as shown in FIG. 4. nnpfc_inp_order_idc may be used only when an input chroma format is 4:2:0. |
| 4 . . . 255 | reserved | nnpfc_auxiliary_inp_idc equal to 1 may specify that auxiliary input data is derived through the method shown in Table 8 to Table 10.

The value of nnpfc_auxiliary_inp_idc shall be in the range of 0 to 1, inclusive, in bitstreams. Values of 2 to 255, inclusive, for nnpfc_inp_order_idc shall not be present in bitstreams. Decoders shall ignore NNPFC SEI messages with nnpfc_inp_order_idc in the range of 2 to 255, inclusive. Values of nnpfc_inp_order_idc greater than 255 shall not be present in bitstreams and are not reserved for future use.

When the value of nnpfc_auxiliary_inp_idc is equal to 1, the variable strengthControlScaledVal may be derived as in Equation 4.

$$if(nnpfc\_inp\_format\_idc == 1)$$

$$strengthControlScaledVal =$$
$$Floor(StrengthControlVal * ((1 \ll inpTensorBitDepth_Y) - 1))(83)$$

$$else$$

$$strengthControlScaledVal = StrengthControlVal$$

A patch is a rectangular array of samples from a component (e.g., a luma or chroma component) of a picture.

nnpfc_auxiliary_inp_idc greater than 0 may indicate that auxiliary input data is present in the input tensor of the NNPF. nnpfc_auxiliary_inp_idc equal to 0 may indicate that auxiliary input data is not present in the input tensor.

The process DeriveInputTensors ( ) to derive an input tensor inputTensor for given vertical sample coordinates cTop and horizontal sample coordinates cLeft specifying the top-left sample position of the sample patch contained in the input tensor may be represented as a combination of Tables 8 to 10.

TABLE 8

```
for( i = 0; i < numInputPics; i++ ) {
    if( nnpfc_inp_order_idc = = 0 )
        for( yP = -napfc_overlap; yP < inpPatchHeight + nnpfc_overlap; yP++)
            for( xP = -nnpfc_overlap; xP < inpPatchWidth + nnpfc_overlap; xP++ ) {
                inpVal = InpY( InpSampleVal( cTop + yP, cLeft + xP, CroppedHeight,
                    CroppedWidth, CroppedYPic[ i ] ) )
                yPovlp = yP + nnpfc_overlap
                xPovlp = xP + nnpfc_overlap
                if( !nnpfc_component_last_flag )
                    inputTensor[ 0 ][ i ][ 0 ][ yPovlp ][ xPovlp ] = inpVal
                else
                    inputTensor[ 0 ][ i ][ yPovlp ][ xPovlp ][ 0 ] = inpVal
                if( nnpfc_auxiliary_inp_idc = = 1 )
                    if( !nnpfc_component_last_flag )
                        inputTensor[ 0 ][ i ][ 1 ][ yPovlp ][ xPovlp ] = strengthControlScaledVal
                    else
                        inputTensor[ 0 ][ i ][ yPovlp ][ xPovlp ][ 1 ] = strengthControlScaledVal
            }
    else if( nnpfc_inp_order_idc = = 1 )
        for( yP = -nnpfc_overlap; yP < inpPatchHeight + nnpfc_overlap; yP++)
            for( xP = -nnpfc_overlap; xP < inpPatchWidth + nnpfc_overlap; xP++ ) {
                inpCbVal = InpC( InpSampleVal( cTop + yP, cLeft + xP, CroppedHeight / SubHeightC,
                    CroppedWidth / SubWidthC, CroppedCbPic[ i ] ) )
                inpCrVal = InpC( InpSampleVal( cTop + yP, cLeft + xP, CroppedHeight / SubHeightC,
                    CroppedWidth / SubWidthC, CroppedCrPic[ i ] ) )
                yPovlp = yP + nnpfc_overlap
                xPovlp = xP + nnpfc_overlap
                if( !nnpfc_component_last_flag ) {
                    inputTensor[ 0 ][ i ][ 0 ][ yPovlp ][ xPovlp ] = inpCbVal
                    inputTensor[ 0 ][ i ][ 1 ][ yPovlp ][ xPovlp ] = inpCrVal
                } else {
                    inputTensor[ 0 ][ i ][ yPovlp ][ xPovlp ][ 0 ] = inpCbVal
                    inputTensor[ 0 ][ i ][ yPovlp ][ xPovlp ][ 1 ] = inpCrVal
                }
                if( nnpfc_auxiliary_inp_idc = = 1 )
                    if( !nnpfc_component_last_flag )
                        inputTensor[ 0 ][ i ][ 2 ][ yPovlp ][ xPovlp ] = strengthControlScaledVal
                    else
                        inputTensor[ 0 ][ i ][ yPovlp ][ xPovlp ][ 2 ] = strengthControlScaledVal
            }
```

TABLE 9

```
    else if( nnpfc_inp_order_idc = = 2 )
        for( yP = -nnpfc_overlap; yP < inpPatchHeight + nnpfc_overlap; yP++)
            for( xP = -nnpfc_overlap; xP < inpPatchWidth + nnpfc_overlap; xP++ ) {
                yY = cTop + yP
                xY = cLeft + xP
                yC = yY / SubHeightC
                xC = xY / SubWidthC
                inpYVal = InpY( InpSampleVal( yY, xY, CroppedHeight,
                    CroppedWidth, CroppedYPic[ i ] ) )
                inpCbVal = InpC( InpSampleVal( yC, xC, CroppedHeight / SubHeightC,
                    CroppedWidth / SubWidthC, CroppedCbPic[ i ] ) )
                inpCrVal = InpC( InpSampleVal( yC, xC, CroppedHeight / SubHeightC,
                    CroppedWidth / SubWidthC, CroppedCrPic[ i ] ) )
                yPovlp = yP + nnpfc_overlap
                xPovlp = xP + nnpfc_overlap
                if( !nnpfc_component_last_flag ) {
                    inputTensor[ 0 ][ i ][ 0 ][ yPovlp ][ xPovlp ] = inpYVal
                    inputTensor[ 0 ][ i ][ 1 ][ yPovlp ][ xPovlp ] = inpCbVal
                    inputTensor[ 0 ][ i ][ 2 ][ yPovlp ][ xPovlp ] = inpCrVal
                } else {
                    inputTensor[ 0 ][ i ][ yPovlp ][ xPovlp ][ 0 ] = inpYVal
                    inputTensor[ 0 ][ i ][ yPovlp ][ xPovlp ][ 1 ] = inpCbVal
                    inputTensor[ 0 ][ i ][ yPovlp ][ xPovlp ][ 2 ] = inpCrVal
                }
                if( nnpfc_auxiliary_inp_idc = = 1 )
                    if( !nnpfc_component_last_flag )
                        inputTensor[ 0 ][ i ][ 3 ][ yPovlp ][ xPovlp ] = strengthControlScaledVal
                    else
                        inputTensor[ 0 ][ i ][ yPovlp ][ xPovlp ][ 3 ] = strengthControlScaledVal
            }
    else if( nnpfc_inp_order_idc = = 3 )
        for( yP = -nnpfc_overlap; yP < inpPatchHeight + nnpfc_overlap; yP++)
            for( xP = -nnpfc_overlap; xP < inpPatchWidth + nnpfc_overlap; xP++ ) {
```

TABLE 9-continued

```
yTL = cTop + yP * 2
xTL = cLeft + xP * 2
yBR = yTL + 1
xBR = xTL + 1
yC = cTop / 2 + yP
xC = cLeft / 2 + xP
inpTLVal = InpY( InpSampleVal( yTL, xTL, CroppedHeight,
    CroppedWidth, CroppedYPic[ i ] ) )
inpTRVal = InpY( InpSampleVal( yTL, xBR, CroppedHeight,
    CroppedWidth, CroppedYPic[ i ] ) )
inpBLVal = InpY( InpSample Val( yBR, xTL, CroppedHeight,
    CroppedWidth, CroppedYPic[ i ] ) )
```

TABLE 10

```
inpBRVal = InpY( InpSample Val( yBR, xBR, CroppedHeight,
    CroppedWidth, CroppedYPic[ i ] ) )
inpCbVal = InpC( InpSampleVal( yC, xC, CroppedHeight / 2,
    CroppedWidth / 2, CroppedCbPic[ i ] ) )
inpCrVal = InpC( InpSampleVal( yC, xC, CroppedHeight / 2,
    CroppedWidth / 2, CroppedCrPic[ i ] ) )
yPovlp = yP + nnpfc_overlap
xPovlp = xP + nnpfc_overlap
if( !nnpfc_component_last_flag ) {
    inputTensor[ 0 ][ i ][ 0 ][ yPovlp ][ xPovlp ] = inpTLVal
    inputTensor[ 0 ][ i ][ 1 ][ yPovlp ][ xPovlp ] = inpTRVal
    inputTensor[ 0 ][ i ][ 2 ][ yPovlp ][ xPovlp ] = inpBLVal
    inputTensor[ 0 ][ i ][ 3 ][ yPovlp ][ xPovlp ] = inpBRVal
    inputTensor[ 0 ][ i ][ 4 ][ yPovlp ][ xPovlp ] = inpCbVal
    inputTensor[ 0 ][ i ][ 5 ][ yPovlp ][ xPovlp ] = inpCrVal
} else {
    inputTensor[ 0 ][ i ][ yPovlp ][ xPovlp ][ 0 ] = inpTLVal
    inputTensor[ 0 ][ i ][ yPovlp ][ xPovlp ][ 1 ] = inpTRVal
    inputTensor[ 0 ][ i ][ yPovlp ][ xPovlp ][ 2 ] = inpBLVal
    inputTensor[ 0 ][ i ][ yPovlp ][ xPovlp ][ 3 ] = inpBRVal
    inputTensor[ 0 ][ i ][ yPovlp ][ xPovlp ][ 4 ] = inpCbVal
    inputTensor[ 0 ][ i ][ yPovlp ][ xPovlp ][ 5 ] = inpCrVal
}
if( nnpfc_auxiliary_inp_idc = = 1)
    if( !nnpfc_component last_flag )
        inputTensor[ 0 ][ i ][ 6 ][ yPovlp ][ xPovlp ] =
        strengthControlScaledV
    else
        inputTensor[ 0 ][ i ][ yPovlp ][ xPovlp ][ 6 ] =
        strengthControlScaledV
    }
}
``` nnpfc_separate_colour_description_present_flag equal to 1 may indicate that a unique combination of colour primaries, transform characteristics and matrix coefficients for a picture due to NNPF is specified in the SEI message syntax structure. nnfpc_separate_colour_description_present_flag equal to 0 may indicate that the combination of colour primaries, transform characteristics and matrix coefficients for a picture due to NNPF is the same as indicated in the VUI parameters of CLVS.

nnpfc_colour_primaries may have the same semantics as those defined for the vui_colour_primaries syntax element, except that:

nnpfc_colour_primaries may indicate the primary colors of a picture that result from applying the NNPF specified in the SEI message, rather than the primary colors used in CLVS.

If nnpfc_colour_primaries is not present in the NNPFC SEI message, the value of nnpfc_colour_primaries may be inferred to be the same as the value of vui_colour_primaries.

nnpfc_transfer_characteristics may have the same semantics as those defined for the vui_transfer_characteristics syntax element, except that:

nnpfc_transfer_characteristics may indicate the transform characteristics of a picture that results from applying the NNPF specified in the SEI message, rather than the transform characteristics used in the CLVS.

If nnpfc_transfer_characteristics is not present in the NNPFC SEI message, the value of nnpfc_transfer_characteristics may be inferred to be the same as the value of vui_transfer_characteristics.

nnpfc_matrix_coeffs may have the same semantics as specified for the vui_matrix_coeffs syntax element, except that:

nnpfc_matrix_coeffs may indicate the matrix coefficients of the picture resulting from applying the NNPF specified in the SEI message, rather than the matrix coefficients used for CLVS.

If nnpfc_matrix_coeffs is not present in the NNPFC SEI message, the value of nnpfc_matrix_coeffs may be inferred to be the same as the value of vui_matrix_coeffs.

The allowed values for nnpfc_matrix_coeffs may not be restricted by the chroma format of the decoded video pictures, as indicated by the ChromaFormatIde value for the semantics of the VUI parameters.

If the value of nnpfc_matrix_coeffs is equal to 0, the value of nnpfc_out_order_idc cannot be equal to 1 or 3.

nnpfc_out_format_idc equal to 0 may indicate that the sample values output by the NNPF are real numbers whose value range from 0 to 1 is linearly mapped to an unsigned integer value range from 0 to (1<<bitDepth)−1, for the bit depth bitDepth required for subsequent post-processing or display. nnpfc_out_format_idc equal to 1 may indicate that the luma sample values output by the NNPF are unsigned integers in the range from 0 to (1<< (nnpfc_out_tensor_luma_bitlength_minus8+8))−1, and that the chroma sample values output by the NNPF are unsigned integers in the range from 0 to (1<< (nnpfc_out_tensor_chroma_bitlength_minus8+8))−1.

Values of nnpfc_out_format_idc greater than 1 may be reserved for future use and are not present in the bitstream. Decoders must ignore NNPFC SEI messages containing reserved values of nnpfc_out_format_idc.

nnpfc_out_tensor_luma_bitdepth_minus8+8 may indicate the bit depth of luma sample values in the output tensor. The value integer of nnpfc_out_tensor_luma_bitdepth_minus8 shall be in the range of 0 to 24, inclusive.

nnpfc_out_tensor_chroma_bitdepth_minus8+8 may indicate the bit depth of chroma sample values in the output integer tensor. The value of nnpfc_out_tensor_chroma_bitdepth_minus8 shall be in the range of 0 to 24, inclusive.

If nnpfc_purpose & 0x10 is not equal to 0, the value of nnpfc_out_format_idc shall be equal to 1, and at least one of the following constraints may be true:

nnpfc_out_tensor_luma_bitdepth_minus8+8 is greater than BitDepthy nnpfc_out_tensor_chroma_bitdepth_minus8+8 is greater
than BitDepthc nnpfc_out_order_idc may indicate the output order of
samples output from the NNPF. The value of nnpfc_ou-
t_order_idc shall be in the range of 0 to 3, inclusive, in the
bitstream. The value of nnpfc_out_order_idc in the range of
4 to 255 is not present in the bitstream. Decoders shall ignore
NNPFC SEI messages with nnpfc_out_order_idc in the
range of 4 to 255, inclusive. The value of nnpfc_out_orde-
r_idc greater than 255 is not present in the bitstream and is
not reserved for future use. If the value of nnpfc_purpose &
0x02 is 0, the value of nnpfc_out_order_idc shall not be
equal to 3.

Table 11 describes the values of nnpfc_out_order_idc.

TABLE 11

| Nnpfc_out_order_idc | Description |
|---|---|
| 0 | Since only a luma matrix is present in the output tensor, the number of channels may be equal to 1. |

TABLE 11-continued

| Nnpfc_out_order_idc | Description |
|---|---|
| 1 | Since only chroma matrices are present in the output tensor, the number of channels may be equal to 2. |
| 2 | Since luma and chroma matrices are present in the output tensor, the number of channels may be equal to 3. |
| 3 | Since four luma matrices and two chroma imatrices are present n the output tensor, the number of channels may be equal to 6. It may be used only when nnpfc_out_order_idc output chroma format is 4:2:0. |
| 4 . . . 255 | reserved |

The process StoreOutputTensors ( ) to derive sample
values in the filtered output sample arrays FilteredYPic,
FilteredCbPic and FilteredCrPic from the output tensor
outputTensor for the given vertical sample coordinates cTop
and horizontal sample coordinates cLeft indicating the top-
left sample position for the patch of samples contained in the
input tensor may be expressed as a combination of Tables 12
and 13.

TABLE 12

```
for( i = 0; i < mumOutputPics; +++ ) {
    if( nnpfc_out_order_idc = = 0 )
        for( yP = 0; yP < outPatchHeight; yP++)
            for( xP = 0; xP < outPatchWidth; xP++ ) }
                yY = cTop * outPatchHeight / inpPatchHeight + yP
                xY = cLeft * outPatch Width / inpPatchWidth + xP
                if ( yY < nnpfc_pic_height_in_luma_samples && xY < nnpfc_pic_width_in_luma_samples )
                    if( !nnpfc_component_last_flag )
                        FilteredYPic[ i ][ xY ][yY ] = outputTensor[ 0 ][ i ][ 0 ][ yP ][ xP ]
                    else
                        FilteredYPic[ i ][ xY ][ yY ] = outputTensor[ 0 ][ i ][ yP ][ xP ][ 0 ]
    else if( nnpfc_out_order_idc = = 1 )
        for( yP = 0; yP < outPatchCHeight; yP++)
            for( xP = 0; xP < outPatchCWidth; xP++ ) {
                xSrc = cLeft * horCScaling + xP
                ySrc = cTop * verCScaling + yP
                if ( ySrc < nnpfc_pic_height_in_luma_samples / outSubHeightC &&
                    xSrc < nnpfc_pic_width_in_luma samples / outSubWidthC )
                    if( !nnpfc_component_last_flag ) {
                        FilteredCbPic[ i ][ xSrc ][ ySrc ] = outputTensor[ 0 ][ i ][ 0 ][ yP ][ xP ]
                        FilteredCrPic[ i ][ xSrc ][ ySrc ] = outputTensor[ 0 ][ i ][ 1 ][ yP ][ xP ]
                    } else {
                        FilteredCbPic[ i ][ xSrc ][ ySrc ] = output Tensor[ 0 ][ i ][ yP ][ xP ][ 0 ]
                        FilteredCrPic[ i ][ xSrc ][ ySrc ] = outputTensor[ 0 ][ i ][ yP ][ xP ][ 1 ]
                    }
            }
    else if( nnpfc_out_order_idc = = 2 )
        for( yP = 0; yP < outPatchHeight; yP++)
            for( xP = 0; xP < outPatch Width: xP++ ) {
                yY = cTop * outPatchHeight / inpPatchHeight + yP
                xY = cLeft * outPatch Width / inpPatchWidth + xP
                yC = yY / outSubHeightC
                xC = xY / outSubWidthC
                yPc = ( yP / outSubHeightC ) * outSubHeightC
                xPc = (xP / outSub WidthC ) * outSub WidthC
                if ( yY < nnpfc_pic_height_in_luma_samples && xY < nnpfc_pic_width_in_luma_samples)
                    if( !nnpfc_component_last_flag ) {
                        FilteredYPic[ i ][ xY ][ yY ] = outputTensor[ 0 ][ i ][ 0 ][ yP ][ xP ]
                        FilteredCbPic[ i ][ xC ][ yC ] = outputTensor[ 0 ][ i ][ 1 ][ yPc ][ xPc ]
                        FilteredCrPic[ i ][ xC ][ yC ] = outputTensor[ 0 ][ i ][ 2 ][ yPc ][ xPc ]
                    } else {
                        FilteredYPic[ i ][ xY ][ yY ] = outputTensor[ 0 ][ i ][ yP ][ xP ][ 0 ]
                        FilteredCbPic[ i ][ xC ][ yC ] = outputTensor[ 0 ][ i ][ yPc ][ xPc ][ 1 ]
                        FilteredCrPic[ i ][ xC ][ yC ] = outputTensor[ 0 ][ i ][ yPc ][ xPc ][ 2 ]
                    }
            }
}
```

TABLE 13

```
else if( nnpfc_out_order_idc = = 3 )
    for( yP = 0; yP < outPatchHeight; yP++ )
        for( xP = 0; xP < outPatch Width; xP++ ) {
            ySrc = cTop / 2 * outPatchHeight / inpPatchHeight + yP
            xSrc = cLeft / 2 * outPatch Width / inpPatchWidth + xP
            if ( ySrc < nnpfc_pic_height_in_luma_samples / 2 &&
                 xSrc < nnpfc_pic_width_in_luma_samples / 2 )
                if( !nnpfc_component_last_flag ) {
                    FilteredYPic[ i ][ xSrc * 2 ][ ySrc * 2 ] = outputTensor[ 0 ][ i ][ 0 ][ yP ][ xP ]
                    FilteredYPic[ i ][ xSrc * 2 + 1 ][ ySrc * 2 ] = outputTensor[ 0 ][ i ][ 1 ][ yP ][ xP ]
                    FilteredYPic[ i ][ xSrc * 2 ][ ySrc * 2 + 1 ] = outputTensor[ 0 ][ i ][ 2 ][ yP ][ xP ]
                    FilteredYPic[ i ][ xSrc * 2 + 1][ ySrc * 2 + 1 ] = outputTensor[ 0 ][ i ][ 3 ][ yP ][ xP ]
                    FilteredCbPic[ i ][ xSrc ][ ySrc ] = outputTensor[ 0 ][ i ][ 4 ][ yP ][ xP ]
                    FilteredCrPic[ i ][ xSrc ][ ySrc ] = outputTensor[ 0 ][ i ][ 5 ][ yP ][ xP ]
                } else {
                    FilteredYPic[ i ][ xSrc * 2 ][ ySrc * 2 ] = outputTensor[ 0 ][ i ][ yP ][ xP ][ 0 ]
                    FilteredYPic[ i ][ xSrc * 2 + 1 ][ ySrc * 2 ] = outputTensor[ 0 ][ i ][ yP ][ xP ][ 1 ]
                    FilteredYPic[ i ][ xSrc * 2 ][ ySrc * 2 + 1 ] = outputTensor[ 0 ][ i ][ yP ][ xP ][ 2 ]
                    FilteredYPic[ i ][ xSrc * 2 + 1][ ySrc * 2 + 1 ] = outputTensor[ 0 ][ i ][ yP ][ xP ][ 3 ]
                    FilteredCbPic[ i ][ xSrc ][ ySrc ] = outputTensor[ 0 ][ i ][ yP ][ xP ][ 4 ]
                    FilteredCrPic[ i ][ xSrc ][ ySrc ] = outputTensor[ 0 ][ i ][ yP ][ xP ][ 5 ]
                }
        }
}
``` nnpfc_overlap may indicate the overlapping horizontal and vertical sample counts of adjacent input tensor of the NNPF. The value of nnpfc_overlap shall be in the range of 0 to 16 383, inclusive.

nnpfc_constant_patch_size_flag equal to 1 may indicate that the NNPF accepts exactly the patch size indicated by nnpfc_patch_width_minus1 and nnpfc_patch_height_minus1 as input. nnpfc_constant_patch_size_flag equal to 0 may indicate that the NNPF accepts as input any patch size with width inpPatch Width and height inpPatchHeight such that the width of an extended patch (i.e., a patch plus the overlapping area), which is equal to inpPatchWidth+2*nnpfc_overlap, is a positive integer multiple of nnpfc_extended_patch_width_cd_delta_minus1+1+2*nnpfc_overlap, and the height of the extended patch, which is equal to inpPatchHeight+2*nnpfc_overlap, is a positive integer multiple of nnpfc_extended_patch_height_cd_delta_minus1+1+2*nnpfc_overlap.

nnpfc_patch_width_minus1+1, when nnpfc_constant_patch_size_flag equal to 1, may indicate the horizontal sample counts of the patch size required for the input to the NNPF. The value of nnpfc_patch_width_minus1 shall be in the range of 0 to Min (32 766, CroppedWidth-1), inclusive.

nnpfc_patch_height_minus1+1, when nnpfc_constant_patch_size_flag equal to 1, may indicate the vertical sample counts of the patch size required for the input to the NNPF. The value of nnpfc_patch_height_minus1 shall be in the range of 0 to Min (32 766, CroppedHeight-1), inclusive.

nnpfc_extended_patch_width_cd_delta_minus1+1+2*nnpfc_overlap, when nnpfc_constant_patch_size_flag equal to 0, may indicate a common divisor of all allowed values of the width of an extended patch required for the input to the NNPF. The value of nnpfc_extended_patch_width_cd_delta_minus1 shall be in the range of 0 to Min (32 766, CroppedWidth-1), inclusive.

nnpfc_extended_patch_height_cd_delta_minus1+1+2*nnpfc_overlap, when nnpfc_constant_patch_size_flag equal to 0, may indicate a common divisor of all allowed values of the height of an extended patch required for the input to the NNPF. The value of nnpfc_extended_patch_height_cd_delta_minus1 shall be in the range of 0 to Min (32 766, CroppedHeight-1), inclusive.

The variables inpPatchWidth and inpPatchHeight may be set to the patch size width and the patch size height, respectively.

If nnpfc_constant_patch_size_flag is equal to 0, the following applies:

The values of inpPatchWidth and inpPatchHeight may be either provided by external means or set by the post-processor itself.

The value of inpPatchWidth+2*nnpfc_overlap shall be a positive integer multiple of nnpfc_extended_patch_width_cd_delta_minus1+1+2*nnpfc_overlap and inpPatchWidth shall be less than or equal to CroppedWidth. The value of inpPatchHeight+2*nnpfc_overlap shall be a positive integer multiple of nnpfc_extended_patch_height_cd_delta_minus1+1+2*nnpfc_overlap and inpPatchHeight shall be less than or equal to CroppedHeight.

Otherwise (nnpfc_constant_patch_size_flag is equal to 1), the value of inpPatch Width may be set equal to nnpfc_patch_width_minus1+1 and the value of inpPatchHeight may be set equal to nnpfc_patch_height_minus1+1.

The variables outPatchWidth, outPatchHeight, horCScaling, verCScaling, outPatchCWidth, and outPatchCHeight may be derived as shown in Table 14.

TABLE 14

```
outPatchWidth = ( nnpfc_pic_width_in_luma_samples *
inpPatchWidth ) / CroppedWidth (86)
outPatchHeight = ( nnpfc_pic_height_in_luma_samples *
inpPatchHeight ) / CroppedHeight (87)
horCScaling = SubWidthC / outSubWidthC
verCScaling = SubHeightC / outSubHeightC
outPatchCWidth = outPatchWidth * horCScaling
outPatchCHeight = outPatchHeight * verCScaling
```

It is a requirement of bitstream conformance that outPatch Width*CroppedWidth shall be equal to nnpfc_pic_width_in_luma_samples*inpPatchWidth, and outPatchHeight*CroppedHeight shall be equal to nnpfc_pic_height_in_luma_samples*inpPatchHeight.

nnpfc_padding_type may indicate the padding process when referencing sample positions outside the boundary of the cropped decoded output picture as described in Table 15. The value of nnpfc_padding_type shall be in the range of 0 to 15, inclusive.

TABLE 15

| nnpfc_padding_type | Description |
|---|---|
| 0 | zero padding |
| 1 | replication padding |
| 2 | reflection padding |
| 3 | wrap-around padding |
| 4 | fixed padding |
| 5 . . . 15 | reserved | nnpfc_luma_padding_val may indicate the luma value to be used for padding when the value of nnpfc_padding_type is 4.

nnpfc_cb_padding_val may indicate the Cb value to be used for padding when the value of nnpfc_padding_type is 4.

nnpfc_cr_padding_val may indicate the Cr value to be used for padding when the value of nnpfc_padding_type is 4.

InpSampleVal (y, x, picHeight, picWidth, CroppedPic) function, whose inputs are vertical sample positions y, horizontal sample positions x, picture height picHeight, picture width picWidth, and sample array CroppedPic, may return the derived Sample Val values as shown in Table 16.

For the input to the InpSampleVal ( ) function, the vertical positions may be listed before the horizontal positions for compatibility with the input tensor rules of some inference engines.

TABLE 16

```
if( nnpfc_padding_type = = 0 )
   if( y < 0 | | x < 0 | | y >= picHeight | | x >= picWidth )
      sampleVal = 0
   else
      sampleVal = croppedPic[ x ][ y ]
else if( nnpfc_padding_type = = 1 )
   sampleVal = croppedPic[ Clip3( 0, picWidth − 1, x ) ][ Clip3( 0, picHeight − 1, y ) ]
else if( nnpfc_padding_type = = 2 )
   sampleVal = croppedPic[ Reflect( picWidth − 1, x ) ][ Reflect( picHeight − 1, y ) ]
else if( nnpfc padding type = = 3 )
   if( y >= 0 && y < picHeight )
      sampleVal = croppedPic[ Wrap( picWidth − 1, x ) ][ y ]
else if( nnpfc padding type = = 4 )
   if( y < 0 | | x < 0 | | y >= picHeight | | x >= picWidth )
      sampleVal[ 0 ] = nnpfc_luma_padding_val
      sampleVal[ 1 ] = nnpfc cb padding val
      sampleVal[ 2 ] = nnpfc_cr_padding_val
   else
      sampleVal = croppedPic[ x ][ y ]
```

The process of Table 17 may be used, with the NNPF PostProcessingFilter ( ) to generate, in a patch-wise manner, the filtered and/or interpolated picture(s), which may contain Y, Cb, and Cr sample arrays FilteredYPic, FilteredCbPic, and FilteredCrPic, respectively, as indicated by nnpfc_out_order_idc:

TABLE 17

```
if( nnpfc_inp_order_idc = = 0 | | nnpfc_inp_order_idc = = 2 )
   for( cTop = 0; cTop < CroppedHeight; cTop += inpPatchHeight
      for( cLeft = 0; cLeft < CroppedWidth; cLeft += inpPatch Width ) {
         DeriveInputTensors( )
         outputTensor = PostProcessingFilter( inputTensor )
         StoreOutputTensors( )
      }
else if( nnpfc_inp_order_idc = = 1 )
   for( cTop = 0; cTop < CroppedHeight / SubHeightC; cTop += inpPatchHeight )
      for( cLeft = 0; cLeft < CroppedWidth / SubWidthC; cLeft += inpPatch Width ) {
         DeriveInputTensors( )
         outputTensor = PostProcessingFilter( inputTensor )
         StoreOutputTensors( )
      }
else if( nnpfc_inp_order_idc = = 3 )
   for( cTop = 0; cTop < CroppedHeight; cTop += inpPatchHeight * 2 )
      for( cLeft = 0; cLeft < CroppedWidth; cLeft += inpPatchWidth * 2 ) {
         DeriveInputTensors( )
         outputTensor = PostProcessingFilter( inputTensor )
         StoreOutputTensors( )
      }
```

US 12,574,563 B2

33                                                         34

The order of the stored pictures in the output tensor may be the output order, and the output order generated by applying NNPF to the output order may be interpreted as an output order that does not conflict with the output order of the input pictures.

nnpfc_complexity_info_present_flag equal to 1 may specify that one or more syntax elements that indicate the complexity of the NNPF associated with the nnpfc_id are present. nnpfc_complexity_info_present_flag equal to 0 may specify that no syntax elements that indicates the complexity of the NNPF associated with the nnpfc_id are present.

nnpfc_parameter_type_idc equal to 0 may indicate that the neural network uses only integer parameters. nnpfc_parameter_type_flag equal to 1 may indicate that the neural network may use floating point or integer parameters. nnpfc_parameter_type_idc equal to 2 may indicate that the neural network uses only binary parameters. nnpfc_parameter_type_idc equal to 3 may be reserved for future use and shall not be present in bitstreams. Decoders shall ignore NNPFC SEI messages with nnpfc_parameter_type_idc equal to 3.

nnpfc_log 2_parameter_bit_length_minus3 equal to 0, 1, 2, and 3 may indicate that the neural network does not use parameters of bit length greater than 8, 16, 32, and 64, respectively. When nnpfc_parameter_type_idc is present and nnpfc_log 2_parameter_bit_length_minus3 is not present, the neural network may not use parameters of bit length greater than 1.

nnpfc_num_parameters_idc may indicate the maximum number of neural network parameters for the NNPF in units of a power of 2 048. nnpfc_num_parameters_idc equal to 0 may indicate that the maximum number of neural network parameters is unknown. The value nnpfc_num_parameters_idc shall be in the range of 0 to 52, inclusive. Values of nnpfc_num_parameters_idc greater than 52 are reserved for future use and shall not be present in bitstreams. Decoders shall ignore NNPFC SEI messages with nnpfc_num_parameters_idc greater than 52.

If the value of nnpfc_num_parameters_idc is greater than zero, the variable maxNumParameters is derived as shown in Equation 5.

$$maxNumParameters = \qquad\qquad \text{[Equation 5]}$$

$$(2048 \ll nnpfc\_num\_parameters\_idc) - 1$$

It is a requirement of bitstream conformance that the number of neural network parameters of the NNPF shall be less than or equal to max NumParameters.

nnpfc_num_kmac_operations_idc greater than 0 may indicate that the maximum number of multiply-accumulate operations per sample of the NNPF is less than or equal to nnpfc_num_kmac_operations_idc*1 000. nnpfc_num_kmac_operations_idc equal to 0 may indicate that the maximum number of multiply-accumulate operations of the network is unknown. The value of nnpfc_num_kmac_operations_idc shall be in the range of 0 to $2^{32}$-2, inclusive.

nnpfc_total_kilobyte_size greater than 0 may indicate a total size in kilobytes required to store the uncompressed parameters for the neural network. The total size in bits is a number equal to or greater than the sum of bits used to store each parameter. nnpfc_total_kilobyte_size is the total size in bits divided by 8 000, rounded up. nnpfc_total_kilobyte_size equal to 0 may indicate that the total size required to store the parameters for the neural network is unknown. The value of nnpfc_total_kilobyte_size shall be in the range of 0 to $2^{32}$-2, inclusive.

nnpfc_reserved_zero_bit_b shall be equal to 0 in bitstreams. Decoders shall ignore NNPFC SEI messages in which nnpfc_reserved_zero_bit_b is not equal to 0.

nnpfc_payload_byte [i] may contain the i-th byte of a bitstream. The byte sequence nnpfc_payload_byte [i] for all present values of i shall be a complete bitstream that conforms to ISO/IEC 15938-17.

Neural-Network Post-Filter Activation (NNFPA)

The syntax structure for the NNFPA is shown in Table 18.

TABLE 18

| nn_post_filter_activation( payloadSize ) { | Descriptor |
|---|---|
| nnpfa_target_id | ue(v) |
| nnpfa_cancel_flag | u(1) |
| if( !nnpfa_cancel_flag ) | |
| nnpfa_persistence_flag | u(1) |
| } | |

The NNPFA syntax structure of Table 18 may be signaled in the form of an SEI message. An SEI message signaling the NNPFA syntax structure of Table 18 may be referred to as an NNPFA SEI message.

The neural-network post-filter activation (NNPFA) SEI message may activate or de-activate the possible use of the target neural-network post-processing filter (NNPF), identified by nnpfa_target_id, for post-processing filtering of a set of pictures. For a particular picture for which the NNPF is activated, the target NNPF may be an NNPF specified by the last NNPFC SEI message having a nnpfc_id equal to nnpfa_target_id, where the last NNPFC SEI message may precede the first VCL NAL unit of the current picture in decoding order and may not correspond to a repetition of an NNPFC SEI message containing the base NNPF.

There may be several NNPFA SEI messages present for the same picture, for example, when the NNPFs are meant for different purposes or for filtering of different colour components.

nnpfa_target_id may indicate the target NNPF, which is specified by one or more NNPFC SEI messages that pertain to the current picture and have nnpfc_id equal to nnpfa_target_id.

The value of nnpfa_target_id shall be in the range 0 to $2^{32}$–2, inclusive. nnpfa_target_id values in the range 256 to 511 and in the range $2^{31}$ to $2^{32}$–2, inclusive, may be reserved for future use. Decoders shall ignore NNPFA SEI messages with nnpfa_target_id in the range 256 to 511 or $2^{31}$ to $2^{32}$–2, inclusive.

An NNPFA SEI message with a particular value of nnpfa_target_id shall not be present in a current PU unless one or both of the following conditions are true:

Within the current CLVS, there is an NNPFC SEI message with nnpfc_id equal to the particular value of nnpfa_target_id present in a PU preceding the current PU in decoding order.

There is an NNPFC SEI message with nnpfc_id equal to the particular value of nnpfa_target_id in the current PU.

When a PU contains both an NNPFC SEI message with a particular value of nnpfc_id and an NNPFA SEI message with nnpfa_target_id equal to the particular value of nnpfc_id, the NNPFC SEI message shall precede the NNPFA SEI message in decoding order.

nnpfa_cancel_flag equal to 1 may indicate that the persistence of the target NNPF established by any previous NNPFA SEI message with the same nnpfa_target_id as the current SEI message is cancelled, i.e., the target NNPF is no longer used unless it is activated by another NNPFA SEI message with the same nnpfa_target_id as the current SEI message and nnpfa_cancel_flag equal to 0. nnpfa_cancel_flag equal to 0 may indicate that nnpfa_persistence_flag follows.

nnpfa_persistence_flag may specify the persistence of the target NNPF for the current layer. nnpfa_persistence_flag equal to 0 may specify that the target NNPF may be used for post-processing filtering for the current picture only. nnpfa_persistence_flag equal to 1 may specify that the target NNPF may be used for post-processing filtering for the current picture and all subsequent pictures of the current layer in output order until one or more of the following conditions are true:

A new CLVS of the current layer begins.

The bitstream ends.

A picture in the current layer associated with a NNPFA SEI message with the same nnpfa_target_id as the current SEI message and nnpfa_cancel_flag equal to 1 is output that follows the current picture in output order.

The target NNPF is not applied for this subsequent picture in the current layer associated with a NNPFA SEI message with the same nnpfa_target_id as the current SEI message and nnpfa_cancel_flag equal to 1.

The nnpfcTargetPictures may be the set of pictures to which the last NNPFC SEI message with nnpfc_id equal to nnpfa_target_id that precedes the current NNPFA SEI message in decoding order pertains. nnpfaTargetPictures may be the set of pictures for which the target NNPF is activated by the current NNPFA SEI message. It is a requirement of bitstream conformance that any picture included in nnpfaTargetPictures shall also be included in nnpfcTargetPictures.

Post-Filter Hint

A syntax structure for a post-filter hint is shown in Table 19.

filter hint SEI message in output order that applies to the current layer. filter_hint_cancel_flag equal to 0 may indicate that post-filter hint information follows.

filter_hint_persistence_flag may specify the persistence of the post-filter hint SEI message for the current layer. filter_hint_persistence_flag equal to 0 may specify that the post-filter hint applies to the current decoded picture only. filter_hint_persistence_flag equal to 1 may specify that the post-filter hint SEI message applies to the current decoded picture and persists for all subsequent pictures of the current layer in output order until one or more of the following conditions are true:

A new CLVS of the current layer begins.

The bitstream ends.

A picture in the current layer in an AU associated with a post-filter hint SEI message is output that follows the current picture in output order.

filter_hint_size_y may specify the vertical size of the filter coefficient or correlation array. The value of filter_hint_size_y shall be in the range of 1 to 15, inclusive.

filter_hint_size_x may specify the horizontal size of the filter coefficient or correlation array. The value of filter_hint_size_x shall be in the range of 1 to 15, inclusive.

filter_hint_type may identify the type of the transmitted filter hints as specified in Table 20. The value of filter_hint_type shall be in the range of 0 to 2, inclusive. The value of filter_hint_type equal to 3 shall not be present in bitstreams. Decoders shall ignore post-filter hint SEI messages having filter_hint_type equal to 3.

TABLE 20

| Value | Description |
|---|---|
| 0 | Coefficients of 2D-FIR filter |
| 1 | Coefficients of 1D-FIR filters |
| 2 | Cross-correlation matrix |

TABLE 19

| post_filter_hint( payloadSize ) { | Descriptor |
|---|---|
|   filter_hint_cancel_flag | u(1) |
|   if( !filter_hint_cancel_flag ) { | |
|     filter_hint_persistence_flag | u(1) |
|     filter_hint_size_y | ue(v) |
|     filter_hint_size_x | ue(v) |
|     filter_hint_type | u(2) |
|     filter_hint_chroma_coeff_present_flag | u(1) |
|     for( cIdx = 0; cIdx < ( filter_hint_chroma_coeff_present_flag ? 3 : 1 ); cIdx++ ) | |
|       for( cy = 0; cy < filter_hint_size_y; cy++ ) | |
|         for( cx = 0; cx < filter_hint_size_x; cx++ ) | |
|           filter_hint_value[ cIdx ][ cy ][ cx ] | se(v) |
|   } | |
| } | |

The post-filter hint syntax structure of Table 19 may be signaled in the form of an SEI message. The SEI message signaling the post-filter hint syntax structure of Table 19 may be referred to as a post-filter hint SEI message.

This SEI message provides the coefficients of a post-filter or correlation information for the design of a post-filter for potential use in post-processing of a set of pictures after they are decoded and output to obtain improved displayed quality.

filter_hint_cancel_flag equal to 1 may indicate that the SEI message cancels the persistence of any previous post-filter_hint_chroma_coeff_present_flag equal 1 may specify that filter coefficients for chroma are present. filter_hint_chroma_coeff_present_flag equal 0 may specify that filter coefficients for chroma are not present.

filter_hint_value [cIdx][cy][cx] may specify a filter coefficient or an element of a cross-correlation matrix between the original and the decoded signal with 16-bit precision. The value of filter_hint_value [cIdx][cy][cx] shall be in the range of $-2^{31}+1$ to $2^{31}-1$, inclusive. cIdx may specifies the related colour component, cy represents a counter in vertical direction and cx represents a counter in horizontal direction. Depending on the value of filter_hint_type, the following applies:

If filter_hint_type is equal to 0, the coefficients of a 2-dimensional finite impulse response (FIR) filter with the size of filter_hint_size_y*filter_hint_size_x may be transmitted.

Otherwise, if filter_hint_type is equal to 1, the filter coefficients of two 1-dimensional FIR filters may be transmitted. In this case, filter_hint_size_y shall be equal to 2. The index cy equal to 0 specifies the filter coefficients of the horizontal filter and cy equal to 1 specifies the filter coefficients of the vertical filter. In the filtering process, the horizontal filter is applied first and the result is filtered by the vertical filter.

Otherwise (filter_hint_type is equal to 2), the transmitted hints may specify a cross-correlation matrix between the original signal s and the decoded signal s'.

The normalized cross-correlation matrix for a related colour component identified by cIdx with the size of filter_hint_size_y*filter_hint_size_x may be defined as shown in Equation 6.

$$\text{filter\_hint\_value}(cIdx, cy, cx) = \qquad \text{[Equation 6]}$$

$$\frac{1}{\left(2^{8*bitDepth} - 1\right)^2 * h * w} \sum_{m=0}^{h-1} \sum_{n=0}^{w-1} s(m, n) *$$

$$s'(m + cy - OffsetY, n + cx - OffsetX)$$

In Equation 6, s denotes array of samples of the colour component cIdx of the original picture, s' denotes corresponding array of the decoded picture, h denotes the vertical height of the related colour component, w denotes the horizontal width of the related colour component, bitDepth denotes the bit depth of the colour component, OffsetY is equal to (filter_hint_size_y>>1), OffsetX is equal to (filter_hint_size_x>>1), the range of cy is 0<=cy<filter_hint_size_y and the range of cx is 0<=cx<filter_hint_size_x.

A decoder can derive a Wiener post-filter from the cross-correlation matrix of original and decoded signal and the auto-correlation matrix of the decoded signal.

Problems of the Related Art

To control the size of the output picture, the following design is currently applied:

If the purpose of the NNPF does not include spatial upsampling, the size of the output picture is inferred to be the same as the size of the input picture.

Otherwise, the size of the output picture is signaled.

Considering that an NNPF carrying a NNPFC SEI message may be activated by more than one NNPFA SEI message in different pictures, the size of the input picture may vary depending on the activation time, but currently, the size of the output picture is fixed to be the same if the NNPF includes the purpose of spatial upsampling.

Embodiment

The present disclosure proposes various embodiments to solve the problems described above. The embodiments proposed by the present disclosure may be performed individually or in combination with each other.

Through the present disclosure, the following possible and suitable embodiments are proposed.

1. The bitstream may contain various picture sizes, and NNPF may be used to upsample the resolution of all pictures to the same size.

2. The bitstream may contain various picture sizes, and NNPF may be used to upsample the resolution of all pictures while maintaining the ratio of the picture resolution of the input bitstream.

The embodiments proposed through the present disclosure are summarized as follows.

1. When signaling an output picture size, a flag (i.e., nnpfc_output_pic_size_flag) may be added to indicate whether the output picture size is a fixed size (i.e., given width and height) or a ratio relative to the input picture size. nnpfc_output_pic_size_flag equal to 0 may indicate that the width and height of the luma samples for the output picture size are present. nnpfc_output_pic_size_flag equal to 1 may indicate that a ratio of the output picture to the input picture size is present.

2. When the value of nnpfc_output_pic_size_flag is 1, nnpfc_pic_width_ratio_num and nnpfc_pic_width_ratio_denum indicating the numerator and denominator of the ratio of the output picture width to the input picture width may be signaled, and nnpfc_pic_height_ratio_num and nnpfc_pic_height_ratio_denum indicating the numerator and denominator of the ratio of the output picture height to the input picture height may be signaled.

3. When signaling the output picture size, scale ratio values for width and height may be signaled. The ratio may be signaled as numerator and denominator values. The ratio (or ratio value) may be signaled using the "minus1" term to save bits and avoid signaling of a zero value. Additionally, the ratio (or ratio value) may be encoded and signaled via 0-th order Exponential Golomb (uc (v)) encoding.

4. nnpfc_pic_width_num_minus1 may indicate the numerator for the ratio between the input picture width and the output picture width, and nnpfc_pic_width_denum_minus1 may indicate the denominator for the ratio between the input picture width and the output picture width. nnpfc_pic_height_num_minus1 may indicate the numerator for the ratio between the input picture height and the output picture height, and nnpfc_pic_height_denum_minus1 may indicate the denominator for the ratio between the input picture height and the output picture height.

5. The output picture width may be derived by rounding up a non-integer ratio multiplied by the input picture width. Similarly, the output picture height may be derived by rounding up a non-integer ratio multiplied by the input picture height.

6. If nnpfc_pic_width_num_minus1, nnpfc_pic_width_denum_minus1, nnpfc_pic_height_num_minus1, and nnpfc_pic_height_denum_minus1 are present, the value of (nnpfc_pic_width_num_minus1+1)= (nnpfc_pic_width_denum_minus1+1) shall have a non-1 value, or the value of (nnpfc_pic_height_num_minus1+1)= (nnpfc_pic_height_denum_minus1+1) shall have a non-1 value.

7. Alternatively, if nnpfc_pic_width_num_minus1, nnpfc_pic_width_denum_minus1, nnpfc_pic_height_num_minus1, and nnpfc_pic_height_denum_minus1 are present, the value of (nnpfc_pic_width_num_minus1+1)= (nnpfc_pic_width_denum_minus1+1) shall be greater than 1, or the value of (nnpfc_pic_height_num_minus1+1) (nnpfc_pic_height_denum_minus1+1) shall be greater than 1.

Hereinafter, embodiments of the present disclosure will be described in detail.

Embodiment 1

Embodiment 1 relates to 1 and 2 of the summaries described above.

According to Embodiment 1, the NNPFC SEI message may be configured as shown in Table 21.

TABLE 21

| nn_post_filter_characteristics( payloadSize ) { | Descriptor |
|---|---|
| ... | |
| nnpfc_property_present_flag | u(1) |
| if( nnpfc_property present_flag ) { | |
| ... | |
| if( ( nnpfc_purpose & 0x04 ) != 0 ) { | |
| nnpfc_output_pic_size_flag | u(1) |
| if( nnpfc_output_pic_size_flag = = 0 ) { | |
| nnpfc_pic_width_in_luma_samples | ue(v) |
| nnpfc_pic_height_in_luma_samples | ue(v) |
| } else { | |
| nnpfc_pic_width_ratio_num | ue(v) |
| nnpfc_pic_width_ratio_denum | ue(v) |
| nnpfc_pic_height_ratio_num | ue(v) |
| nnpfc_pic_height_ratio_denum | ue(v) |
| } | |
| } | |
| ... | |
| } | |
| ... | |
| } | | nnpfc_output_pic_size_flag equal to 0 may indicate that nnpfc_pic_width_in_luma_samples and nnpfc_pic_width_in_luma_samples are present. nnpfc_output_pic_size_flag equal to 1 may indicate that nnpfc_pic_width_ratio_num, nnpfc_pic_width_ratio_denum, nnpfc_pic_height_ratio_num, and nnpfc_pic_height_ratio_denum are present.

nnpfc_pic_width_in_luma_samples and nnpfc_pic_height_in_luma_samples may indicate the width and height, respectively, of the luma sample array of the picture resulting from applying the NNPF identified by nnpfc_id to the cropped decoded output picture. The value of nnpfc_pic_width_in_luma_samples may be in the range of CroppedWidth to CroppedWidth*16-1, inclusive, and the value of nnpfc_pic_height_in_luma_samples may be in the range of CroppedHeight to CroppedHeight*16-1, inclusive.

CroppedWidth may indicate the width of an input picture, and CroppedHeight may indicate the height of the input picture.

nnpfc_pic_width_ratio_num and nnpfc_pic_width_ratio_denum may indicate the numerator and denominator of the ratio of the output picture width to CroppedWidth, respectively. The values of nnpfc_pic_width_ratio_num and nnpfc_pic_width_ratio_denum may be present in the range of 1 to 16-1, inclusive.

The variable Pic WidthInLumaSamples, which indicates the width of the output picture, may be derived as follows.

If nnpfc_output_pic_size_flag is not present, the value of PicWidthInLumaSamples may be set equal to Cropped-Width Otherwise, if nnpfc_output_pic_size_flag is 0, the value of PicWidthInLumaSamples may be set equal to nnpfc_pic_width_in_luma_samples.

Otherwise (i.e. nnpfc_output_pic_size_flag is 1), the value of PicWidthInLumaSamples may be set equal to (CroppedWidth*nnpfc_pic_width_ratio_num)/ nnpfc_pic_width_ratio_denum.

nnpfc_pic_height_ratio_num and nnpfc_pic_height_ratio_denum may indicate the numerator and denominator, respectively, of the ratio of the output picture height to CroppedHeight. The values of nnpfc_pic_height_ratio_num and nnpfc_pic_height_ratio_denum may be present in the range of 1 to 16-1, inclusive.

The variable PicHeightInLumaSamples, which indicates the height of the output picture, may be derived as follows:

If nnpfc_output_pic_size_flag is not present, the value of PicHeightInLumaSamples may be set equal to CroppedHeight.

Otherwise, if nnpfc_output_pic_size_flag is 0, the value of PicHeightInLumaSamples may be set equal to nnpfc_pic_height_in_luma_samples.

Otherwise (i.e. nnpfc_output_pic_size_flag is 1), the value of PicHeightInLumaSamples may be set equal to (CroppedHeight*nnpfc_pic_height_ratio_num)/ nnpfc_pic_height_ratio_denum.

The process StoreOutputTensors ( ) to derive sample values in the filtered output sample arrays FilteredYPic, FilteredCbPic and FilteredCrPic from the output tensor outputTensor with respect to the given vertical sample coordinates cTop and horizontal sample coordinates cLeft indicating the top-left sample position for the patch of samples contained in the input tensor may be modified as a combination of Table 22 and Table 23.

TABLE 22

```
for( i = 0; i < numOutputPics; i++ ) {
    if( nnpfc_out_order_idc = = 0 )
        for( yP = 0; yP < outPatchHeight; yP++)
            for( xP = 0; xP < outPatchWidth; xP++ ) {
                yY = cTop * outPatchHeight / inpPatchHeight + yP
                xY = cLeft * outPatchWidth / inpPatchWidth + xP
                if ( yY < PicHeightInLumaSamples nnpfc pic height in luma samples && xY <
PicWidthInLumaSamples nnpfc pic width in luma samples )
                    if( !nnpfc_component last flag )
                        FilteredYPic[ i ][ xY ][yY ] = outputTensor[ 0 ][ i ][ 0 ][ yP ][ xP ]
                    else
                        FilteredYPic[ i ][ xY ][ yY ] = output Tensor[ 0 ][ i ][ yP ][ xP ][ 0 ]
    else if( nnpfc_out_order_idc = = 1 )
        for( yP = 0; yP < outPatchCHeight; yP++)
            for( xP = 0; xP < outPatchCWidth; xP++ ) {
                xSrc = cLeft * horCScaling + xP
                ySrc = cTop * verCScaling + yP
                if ( ySrc < PicHeightInLumaSamples nnpfc pic height in luma samples / outSubHeightC &&
                    xSrc < Pic WidthInLumaSamples nnpfc pic width in luma samples / outSub WidthC )
```

TABLE 22-continued

```
        if( !nnpfc_component_last_flag ) {
            FilteredCbPic[ i ][ xSrc ][ ySrc ] = outputTensor[ 0 ][ i ][ 0 ][ yP ][ xP ]
            FilteredCrPic[ i ][ xSrc ][ ySrc ] = output Tensor[ 0 ][ i ][ 1 ][ yP ][ xP ]
        } else {|
            FilteredCbPic[ i ][ xSrc ][ ySrc ] = outputTensor[ 0 ][ i ][ yP ][ xP ][ 0 ]
            FilteredCrPic[ i ][ xSic ][ ySrc ] = outputTensor[ 0 ][ i ][ yP ][ xP ][ 1 ]
        }
    }
}
else if( nnpfc_out_order_idc = = 2 )
    for( yP = 0; vP < outPatchHeight; yP++ )
        for( xP = 0; xP < outPatch Width; xP++ ) {
            yY = cTop * outPatchHeight / inpPatchHeight + yP
            xY = cLeft * outPatchWidth / inpPatch Width + xP
            yC = yY / outSubHeightC
            xC = XY / outSubWidthC
            yPc = ( yP / outSubHeightC ) * outSobHeightC
            xPc = ( xP / outSubWidthC ) * outSubWidthC
            if ( yY < PicHeightinLumaSamples ~~nnpfc_pic_height_in_luma_samples~~ && xY <
PicWidthinLumaSamples ~~nnpfc_pic_width_in_luma_samples~~ )
                if( !nnpfc_component last flag ) {
                    FilteredYPic[ i ][ xY ][ yY ] = outputTensor[ 0 ][ i ][ 0 ][ yP ][ xP ]
                    FilteredCbPic[ i ][ xC ][ yC ] = outputTensor[ 0 ][ i ][ 1 ][ yPc ][ xPc ]
                    FilteredCrPic[ i ][ xC ][ yC ] = outputTensor[ 0 ][ i ][ 2 ][ yPc ][ xPc ]
                } else {
                    FilteredYPic[ i ][ xY ][ yY ] = outputTensor[ 0 ][ i ][ yP ][ xP ][ 0 ]
                    FilteredCbPic[ i ][ xC ][ yC ] = outputTensor[ 0 ][ i ][ yPc ][ xPc ][ 1 ]
                    FilteredCrPic[ i ][ xC ][ yC ] = outputTensor[ 0 ][ i ][ yPc ][ xPc ][ 2 ]
                }
        }
```

TABLE 23

```
else if( nnpfc_out_order_idc = = 3 )
    for( yP = 0; yP < outPatchHeight: yP++ )
        for( xP = 0; xP < outPatch Width; xP++ ) {
            ySrc = cTop / 2 * outPatchHeight / inpPatchHeight + yP
            xSrc = cLeft / 2 * outPatch Width / inpPatch Width + xP
            if ( ySrc < PicHeightInLumaSamples ~~nnpfc_pic_height_in_luma_samples~~ / 2 &&
                xSrc < Pic WidthInLumaSamples ~~nnpfc_pic_width_in_luma_samples~~ / 2)
                if( !nnpfc component_last_flag ) {
                    FilteredYPic[ i ][ xSrc * 2 ][ ySrc * 2 ] = outputTensor[ 0 ][ i ][ 0 ][ yP ][ xP ]
                    FilteredYPic[ i ][ xSrc * 2 + 1 ][ ySrc * 2 ] = output Tensor[ 0 ][ i ][ 1 ][ yP ][ xP ]
                    FilteredYPic[ I ][ xSrc * 2 ][ ySrc * 2 + 1 ] = outputTensor[ 0 ][ i ][ 2 ][ yP ][ xP ]
                    FilteredYPic[ i ][ xSrc * 2 + 1][ ySrc * 2 + 1 ] = outputTensor[ 0 ][ i ][ 3 ][ yP ][ xP ]
                    FilteredCbPic[ i ][ xSrc ][ ySrc ] = output Tensor[ 0 ][ 1 ][ 4 ][ yP ][ xP ]
                    FilteredCrPic[ i ][ xSrc ][ ySrc ] = outputTensor[ 0 ][ 1 ][ 5 ][ yP ][ xP ]
                } else {
                    FilteredYPic[ i ][ xSrc * 2 ][ ySrc * 2 ] = outputTensor[ 0 ][ i ][ xP ][ xP ][ 0 ]
                    FilteredYPic[ i ][ xSrc * 2 + 1 ][ ySrc * 2 ] = output Tensor[ 0 ][ i ][ yP ][ xP ][ 1 ]
                    FilteredYPic[ i ][ xSrc * 2 ][ ySrc * 2 + 1 ] = outputTensor[ 0 ][ i ][ yP ][ xP ][ 2 ]
                    FilteredYPic[ i ][ xSrc * 2 + 1][ ySrc * 2 + 1 ] = outputTensor[ 0 ][ i ][ yP ][ xP ][ 3 ]
                    FilteredCbPic[ i ][ xSrc ][ ySrc ] = outputTensor[ 0 ][ i ][ yP ][ xP ][ 4 ]
                    FilteredCrPic[ i ][ xSrc ][ ySrc ] = outputTensor[ 0 ][ i ][ yP ][ xP ][ 5 ]
                }
        }
}
```

The derivation process of variables outPatchWidth, outPatchHeight, horCScaling, verCScaling, outPatchCWidth, and outPatchCHeight may also be modified as shown in Table 24.

TABLE 24

```
outPatchWidth = (PicWidthInLumaSamples ~~nnpfc_pic_width_in_luma_samples~~ *
inpPatchWidth ) /
CroppedWidth
outPatchHeight = (PicHeightInLumaSamples ~~nnpfc_pic_height_in_luma_samples~~ *
inpPatchHeight ) /
CroppedHeight
horCScaling = SubWidthC / outSubWidthC
verCScaling = SubHeightC / outSubHeightC
```

TABLE 24-continued

```
outPatchCWidth = outPatchWidth * horCScaling
outPatchCHeight = outPatchHeight * verCScaling
```

It may be a requirement of bitstream conformance that outPatch Width*CroppedWidth shall be equal to PicWidthInLumaSamples*inpPatchWidth, and that outPatchHeight*CroppedHeight shall be equal to PicHeightInLumaSamples*inpPatchHeight.

Hereinafter, an image encoding method and an image decoding method according to Embodiment 1 will be described. The image encoding method may be performed by the image encoding apparatus 100, and the image decoding method may be performed by the image decoding apparatus 200.

Figure 5:
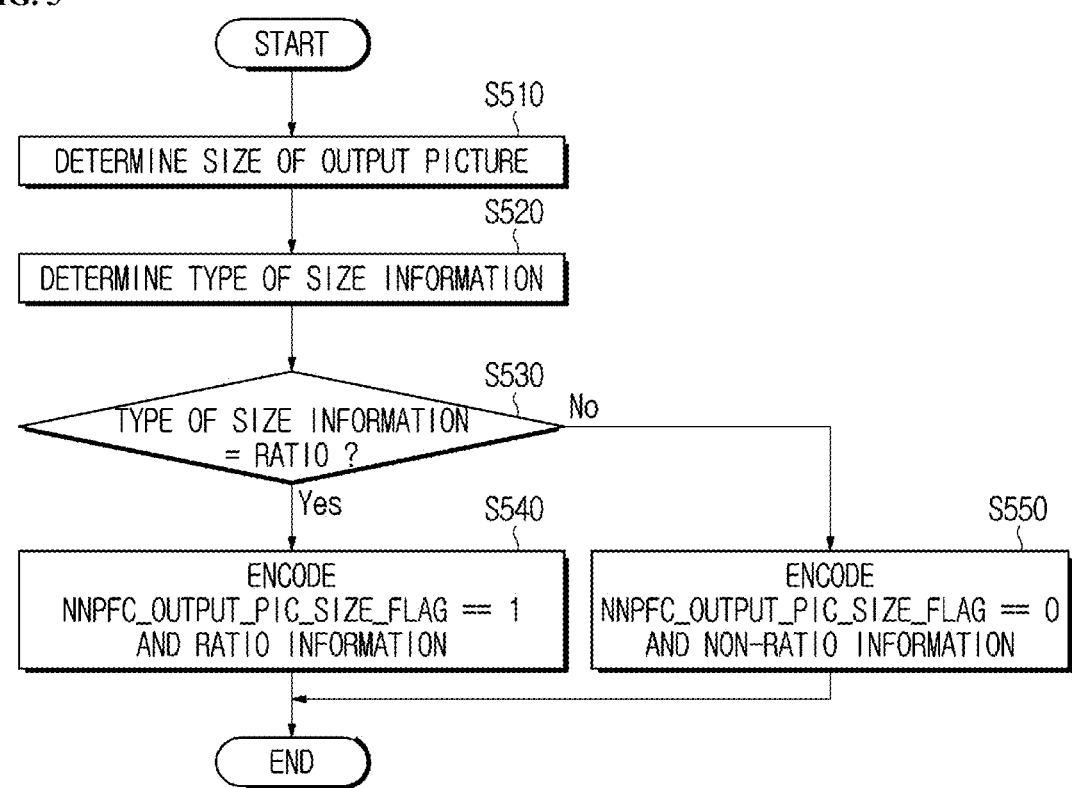
FIG. 5 is a flowchart illustrating an image encoding method according to an embodiment of the present disclosure.
Figure 6:
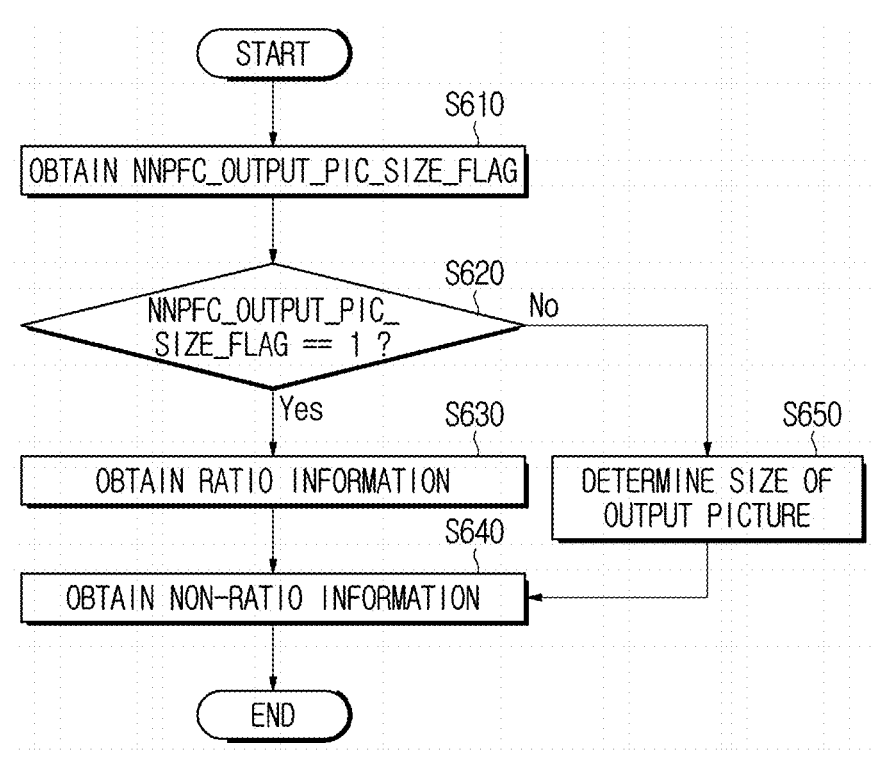
FIG. 6 is a flowchart illustrating an image decoding method according to an embodiment of the present disclosure.

FIG. 5 shows an example of an image encoding method, and FIG. 6 shows an example of an image decoding method.

Referring to FIG. 5, the size of an output picture may be determined (S510). In addition, the type of size information indicating a size of an output picture may be determined (S520). For example, the size information may be composed of nnpfc_pic_width_in_luma_samples indicating the width of the luma sample array of the output picture and nnpfc_pic_height_in_luma_samples indicating the height of the luma sample array of the output picture. As another example, the size information may be composed of nnpfc_pic_width_ratio_num and nnpfc_pic_width_ratio_denum indicating the ratio of the output picture width to the input picture, and nnpfc_pic_height_ratio_num and nnpfc_pic_height_ratio_denum indicating the ratio of the output picture height to the input picture. The size information composed of nnpfc_pic_width_in_luma_samples and nnpfc_pic_height_in_luma_samples may be referred to as "non-ratio information". The size information composed of nnpfc_pic_width_ratio_num, nnpfc_pic_width_ratio_denum, nnpfc_pic_height_ratio_num and nnpfc_pic_height_ratio_denum may be referred to as "ratio information" or "size information". Here, the non-ratio information and the ratio information may correspond to the type of size information.

It may be determined whether the type of the size information is a ratio (S530). If the type of the size information is determined to be a ratio (i.e., ratio information), nnpfc_output_pic_size_flag may be encoded with a first value (e.g., 1) and the ratio information may be encoded (S540). On the other hand, if the type of the size information is determined not to be a ratio (i.e., non-ratio information), nnpfc_output_pic_size_flag may be encoded with a second value (e.g., 0) and the ratio information may be encoded in a bitstream (NNPFC SEI message) (S540). The size information may be encoded based on 0-th order exponential Golomb encoding. nnpfc_output_pic_size_flag may be referred to as "first information".

Referring to FIG. 6, nnpfc_output_pic_size_flag is obtained from a bitstream (NNPFC SEI message) (S610), and the value of nnpfc_output_pic_size_flag may be determined (S620). If the value of nnpfc_output_pic_size_flag is a first value (e.g., 1) indicating that ratio information (or size information) is present, the ratio information may be obtained from the bitstream (S630). Conversely, if the value of nnpfc_output_pic_size_flag is a second value (e.g., 0) indicating that non-ratio information is present, the non-ratio information may be obtained from the bitstream (S650).

The size of the output picture may be determined based on the obtained ratio information or non-ratio information (S640). For example, when the ratio information is obtained, the width (PicWidthInLumaSamples) of the output picture may be determined by applying the width ratio (nnpfc_pic_width_ratio_num/nnpfc_pic_width_ratio_denum) indicated by the ratio information to the width of the input picture, and the height (PicHeightInLumaSamples) of the output picture may be determined by applying the height ratio (nnpfc_pic_height_ratio_num/nnpfc_pic_height_ratio_denum) indicated by the ratio information to the height of the input picture. As another example, when non-ratio information is obtained, the width (PicWidthInLumaSamples) of the output picture may be determined to be a value equal to the width (nnpfc_pic_width_in_luma_samples) indicated by the non-ratio information, and the height (PicHeightInLumaSamples) of the output picture may be determined to be a value equal to the height (nnpfc_pic_height_in_luma_samples) indicated by the non-ratio information.

Embodiment 2

Embodiment 2 relates to 3 to 7 of the summaries described above.

According to Embodiment 2, the NNPFC SEI message may be configured as shown in Table 25.

TABLE 25

| nn_post_filter_characteristics( payloadSize ) { | Descriptor |
|---|---|
| ... | |
|    nnpfc_property_present_flag | u(1) |
|    if( nnpfc_property present_flag ) { | |
|     ... | |
|     if( (nnpfc_purpose & 0x04 ) != 0) { | |
|      ~~nnpfc_pic_width_in_luma_samples~~ | ~~ue(v)~~ |
|      ~~nnpfc_pic_height_in_luma_samples~~ | ~~ue(v)~~ |
|      nnpfc_pic_width_ratio_num_minus1 | ue(v) |
|      nnpfc_pic_width_ratio_denum_minus1 | ue(v) |
|      nnpfc_pic_height_ratio_num_minu1 | ue(v) |
|      nnpfc_pic_height_ratio_denum_minus1 | ue(v) |
|     } | |
|     ... | |
|    } | |
|    ... | |
| } | | nnpfc_pic_width_num_minus1+1 and nnpfc_pic_width_denum_minus1+1 may indicate the numerator and denominator for the ratio of the output picture width to CroppedWidth. The value of (nnpfc_pic_width_num_minus1+1) (nnpfc_pic_width_denum_minus1+1) may be in the range of 1 to 16-1, inclusive.

The value of the variable nnpfcOutputPicWidth may indicate the width of the luma sample array of the picture resulting from applying the NNPF identified by nnpfc_id to the cropped decoded output picture, and may be derived as in Equation 7.

$$nnpfcOutputPicWidth = \quad\quad\quad\quad\quad \text{[Equation 7]}$$

$$Ceil((CroppedWidth * (\text{nnpfc\_pic\_width\_num\_minus1} + 1)) \div$$

$$(\text{nnpfc\_pic\_width\_denum\_minus1} + 1))$$

nnpfc_pic_height_num_minus1+1 and nnpfc_pic_height_denum_minus1+1 may indicate the numerator and denominator for the ratio of the output picture height to CroppedHeight. The value of (nnpfc_pic_height_num_minus1+1)=(nnpfc_pic_height_denum_minus1+1) may be in the range of 1 to 16-1, inclusive.

The value of the variable nnpfcOutputPicHeight may indicate the height of the luma sample array of the picture resulting from applying the NNPF identified by nnpfc_id to the cropped decoded output picture, and may be derived as in Equation 8.

$$nnpfcOutputPicHeight = \quad\quad\quad\quad\quad \text{[Equation 8]}$$

$$Ceil((CroppedHeight * (\text{nnpfc\_pic\_height\_num\_minus1} + 1)) \div$$

$$(\text{nnpfc\_pic\_height\_denum\_minus1} + 1))$$

If nnpfc_pic_width_num_minus1, nnpfc_pic_width_de-num_minus1, nnpfc_pic_height_num_minus1, and nnpfc_pic_height_denum_minus1 are present, the value of (nnpfc_pic_width_num_minus1+1)=(nnpfc_pic_width_de-num_minus1+1) may be greater than 1, or the value of (nnpfc_pic_height_num_minus1+1)=(nnpfc_pic_height_denum_minus1+1) may be greater than 1. Alternatively, if nnpfc_pic_width_num_minus1, nnpfc_pic_width_denum_minus1, nnpfc_pic_height_num_minus1, and nnpfc_pic_height_denum_minus1 are present, the value of (nnpfc_pic_width_num_minus1+1)=(nnpfc_pic_width_denum_minus1+1) may be a non-1 value, or the value of (nnpfc_pic_height_num_minus1+1)=(nnpfc_pic_height_denum_minus1+1) may be a non-1 value.

The process StoreOutputTensors ( ) to derive sample values in the filtered output sample arrays FilteredYPic, FilteredCbPic and FilteredCrPic from the output tensor outputTensor for the given vertical sample coordinates cTop and horizontal sample coordinates cLeft indicating the top-left sample position for the patch of samples contained in the input tensor may be modified as a combination of Table 26 and Table 27.

TABLE 26

```
for( i = 0; i < numOutputPics; i++ ) {
   if( nnpfc_out_order_idc = = 0 )
      for( yP = 0; yP < outPatchHeight, yP++)
         for( xP = 0; xP < outPatch Width; xP++ ) {
            yY = cTop * outPatchHeight / inpPatchHeight + yP
            xY = cLeft * outPatch Width / inpPatchWidth + xP
            if ( yY < nnpfcOutputPicHeight ~~nnpfc_pic_height_in_luma_samples~~ && xY < nnpfcOutputPicWidth
               ~~nnpfc_pic_width_in_luma_samples~~)
                  if( !nnpfc_component_last flag )
                     FilteredYPic[ i ][ xY ][yY ] = outputTensor[ 0 ][ i ][ 0 ][ yP ][ xP ]
                  else
                     FilteredYPic[ i ][ xY ][ yY ] = outputTensor[ 0 ][ i ][ yP ][ xP ][ 0 ]
         }
   else if( nnpfc_out_order idc = = 1 )
      for( yP = 0; yP < outPatchCHeight: yP++)
         for( xP = 0; xP < outPatchCWidth; xP++ ) {
            xSrc = cLeft * horCScaling + xP
            ySrc = cTop * verCScaling + yP
            if ( ySrc < nnpfcOutputPicHeight ~~nnpfc_pic_height_in_luma_samples~~ / outSubHeightC &&
               xSrc < nnpfcOutputPicWidth ~~nnpfc_pic_width_in_luma_samples~~)/ outSubWidthC )
               if( !nnpfc_component_last_flag ) {
                  FilteredCbPic[ i ][ xSrc ][ ySrc ] = outputTensor[ 0 ][ i ][ 0 ][ yP ][ xP ]
                  FilteredCrPic[ i ][ xSrc ][ ySrc ] = output Tensor[ 0 ][ i ][ 1 ][ yP ][ xP ]
               } else
                  FilteredCbPic[ i ][ xSrc ][ ySrc ] = outputTensor[ 0 ][ i ][ yP ][ xP ][ 0 ]
                  FilteredCrPic[ i ][ xSrc ][ ySrc ] = output Tensor[ 0 ][ i ][ yP ][ xP ][ 1 ]
               }
         }
   else if( nnpfc_out_order_idc = = 2 )
      for( yP = 0; yP < outPatchHeight; yP++)
         for( xP = 0; xP < outPatchWidth; xP++ ){
            yY = cTop * outPatchHeight / inpPatchHeight + yP
            xY = cLeft * outPatchWidth / inpPatch Width + xP
            yC = yY / outSubHeightC
            xC = xY / outSubWidthC
            yPc = ( yP / outSubHeightC ) * outSubHeightC
            xPc = ( xP / outSubWidthC ) * outSubWidthC
            if ( yY < nnpfcOutputPicHeight ~~nnpfc_pic_height_in_luma_samples~~ && xY < npfcOutputPicWidth
               ~~nnpfc_pic_width_in_luma_samples~~)
                  if( !nnpfc_component_last_flag ) {
                     FilteredYPic[ i ][ xY ][ yY ] = outputTensor[ 0 ][ 1 ][ 0 ][ yP ][ xP ]
                     FilteredCbPic[ i ][ xC ][ yC ] = outputTensor[ 0 ][ i ][ 1 ][ yPc ][ xPc ]
                     FilteredCrPic[ i ][ xC ][ yC ] = outputTensor[ 0 ][ i ][ 2 ][ yPc ][ xPc ]
                  } else {
                     FilteredYPic[ i ][ xY ][ yY ] = outputTensor[ 0 ][ i ][ yP ][ xP ][ 0 ]
                     FilteredCbPic[ i ][ xC ][ yC ] = outputTensor[ 0 ][ i ][ yPc ][ xPc ][ 1 ]
                     FilteredCrPic[ i ][ xC ][ yC ] = outputTensor[ 0 ][ i ][ yPc ][ xPc ][ 2 ]
                  }
      }
}
```

TABLE 27

```
else if( nnpfc_out_order_idc = = 3 )
    for( yP = 0; yP < outPatchHeight; yP++ )
        for( xP = 0; xP < outPatchWidth; xP++ ) {
            ySrc = cTop / 2 * outPatchHeight / inpPatchHeight + yP
            xSrc = cLeft / 2 * outPatchWidth / inpPatch Width + xP
            if ( ySrc < nnpfcOutputPicHeight nnpfc_pic_height_in_luma_samples / 2 &&
                xSrc < nnpfcOutputPicWidth nnpfc_pic_width_in_luma_samples / 2 )
                if( !nnpfc_component_last_flag ) {
                    FilteredYPic[ i ][ xSrc * 2 ][ ySrc * 2 ] = outputTensor[ 0 ][ i ][ 0 ][ yP ][ xP ]
                    FilteredYPic[ i ][ xSrc * 2 + 1 ][ ySrc * 2 ] = outputTensor[ 0 ][ i ][ 1 ][ yP ][ xP ]
                    FilteredYPic[ i ][ xSrc * 2 ][ ySrc * 2 + 1 ] = outputTensor[ 0 ][ i ][ 2 ][ xP ][ xP ]
                    FilteredYPic[ i ][ xSrc * 2 + 1][ ySrc * 2 + 1 ] = output Tensor[ 0 ][ i ][ 3 ][ yP ][ xP ]
                    FilteredCbPic[ i ][ xSrc ][ ySrc ] = outputTensor[ 0 ][ i ][ 4 ][ yP ][ xP ]
                    FilteredCrPic[ i ][ xSrc ][ ySrc ] = outputTensor[ 0 ][ 1 ][ 5 ][ yP ][ xP ]
                } else {
                    FilteredYPic[ i ][ xSrc * 2 ][ ySrc * 2 ] = outputTensor[ 0 ][ i ][ yP ][ xP ][ 0 ]
                    FilteredYPic[ i ][ xSrc * 2 + 1 ][ ySrc * 2 ] = outputTensor[ 0 ][ i ][ yP ][ xP ][ 1 ]
                    FilteredYPic[ i ][ xSrc * 2 ][ ySrc * 2 + 1 ] = outputTensor[ 0 ][ i ][ yP ][ xP ][ 2 ]
                    FilteredYPic[ i ][ xSrc * 2 + 1][ ySrc * 2 + 1 ] = outputTensor[ 0 ][ i ][ yP ][ xP ][ 3 ]
                    FilteredCbPic[ i ][ xSrc ][ ySrc ] = outputTensor[ 0 ][ i ][ yP ][ xP ][ 4 ]
                    FilteredCrPic[ i ][ xSrc ][ ySrc ] = outputTensor[ 0 ][ i ][ yP ][ xP ][ 5 ]
                }
        }
}
```

The derivation process of variables outPatchWidth, outPatchHeight, horCScaling, verCScaling, outPatchCWidth, and outPatchCHeight may also be changed as shown in Table 28.

TABLE 28

```
outPatchWidth = (nnpfcOutputPicWidth
    nnpfc_pic_width_in_luma_samples * inpPatchWidth ) /
    CroppedWidth
outPatchHeight = (npfcOutputPicHeight
    nnpfc_pic_height_in_luma_samples * inpPatchHeight ) /
    CroppedHeight
horCScaling = SubWidthC / outSubWidthC
verCScaling = SubHeightC / outSubHeightC
outPatchCWidth = outPatchWidth * horCScaling
outPatchCHeight = outPatchHeight * verCScaling
```

It may be a requirement of bitstream conformance that outPatch Width*CroppedWidth shall be equal to nnpfcOutputPicWidth*inpPatchWidth, and that outPatchHeight*CroppedHeight shall be equal to nnpfcOutputPicHeight*inpPatchHeight.

Hereinafter, an image encoding method and an image decoding method according to Embodiment 2 will be described. The image encoding method may be performed by the image encoding apparatus 100, and the image decoding method may be performed by the image decoding apparatus 200.

Figure 7:
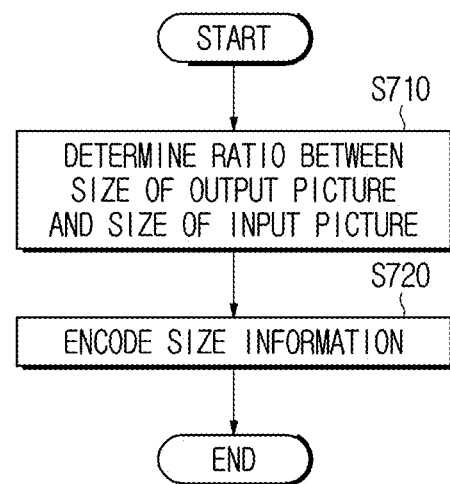
FIG. 7 is a flowchart illustrating an image encoding method according to another embodiment of the present disclosure.
Figure 8:
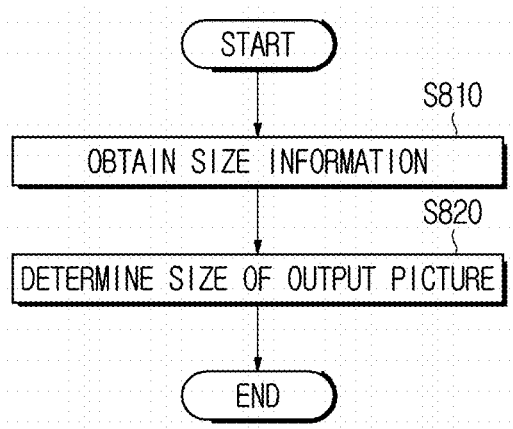
FIG. 8 is a flowchart illustrating an image decoding method according to another embodiment of the present disclosure.

FIG. 7 shows an example of an image encoding method, and FIG. 8 shows an example of an image decoding method.

Referring to FIG. 7, a ratio between a size of an output picture and a size of an input picture may be determined (S710). In addition, size information of the determined ratio may be encoded in a bitstream (NNPFC SEI message) (S720). The size information may be encoded based on 0-th order exponential Golomb encoding.

The size information may include information about the numerator value of the determined ratio and information about the denominator value. The information about the numerator value may include information (nnpfc_pic_width_num_minus1) about the numerator value of the ratio (width ratio) between the width of the output picture and the width of the input picture and information (nnpfc_pic_height_num_minus1) about the numerator value of the ratio (height ratio) between the height of the output picture and the height of the input picture. In addition, the information about the denominator value may include information (nnpfc_pic_width_denum_minus1) about the denominator value of the width ratio and information (nnpfc_pic_height_denum_minus1) about the denominator value of the height ratio.

Information about the numerator value (nnpfc_pic_width_num_minus1, nnpfc_pic_height_num_minus1) may indicate a value obtained by subtracting 1 from the numerator value of the width ratio, and may indicate a value obtained by subtracting 1 from the numerator value of the height ratio. Therefore, the numerator value of the width ratio may be determined to be a value obtained by adding 1 to the information about the numerator value, and the numerator value of the height ratio may be determined to be a value obtained by adding 1 to the information about the numerator value. In addition, information about the denominator value (nnpfc_pic_width_denum_minus1, nnpfc_pic_height_denum_minus1) may indicate a value obtained by subtracting 1 from the denominator value of the width ratio, and may indicate a value obtained by subtracting 1 from the denominator value of the height ratio. Therefore, the denominator value of the width ratio may be determined to be a value obtained by adding 1 to the information about the denominator value, and the denominator value of the height ratio may be determined to be a value obtained by adding 1 to the information about the denominator value.

Referring to FIG. 8, when the size information is obtained from a bitstream (NNPFC SEI message) (S810), the size of the output picture may be determined based on the obtained size information (S820). Here, the size determination of the output picture may be performed by resolution upsampling.

For example, the width (nnpfcOutputPicWidth) of the output picture may be determined by applying a width ratio ((nnpfc_pic_width_num_minus1+1)=(nnpfc_pic_width_denum_minus1+1)) to the width value (CroppedWidth) of the input picture, and rounding up the width of the input picture to which the width ratio is applied. As another example, the height (nnpfcOutputPicHeight) of the output picture may be determined by applying a height ratio ((nnpfc_pic_height_num_minus1+1) (nnpfc_pic_height_denum_minus1+1)) to the height value (CroppedHeight) of the input picture, and rounding up the height of the input picture to which the height ratio is applied.

Figure 9:
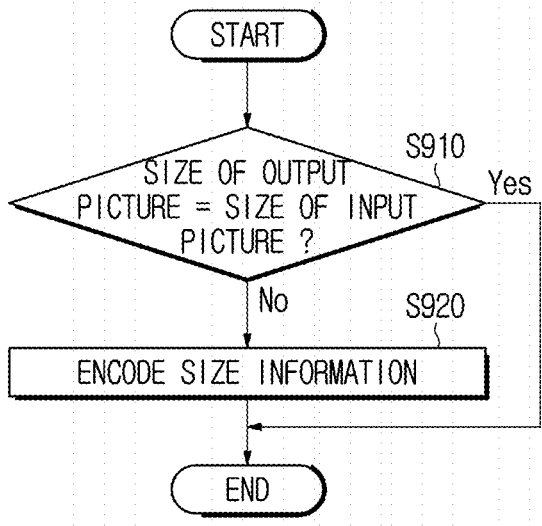
FIG. 9 is a flowchart illustrating an image encoding method according to another embodiment of the present disclosure.
Figure 10:
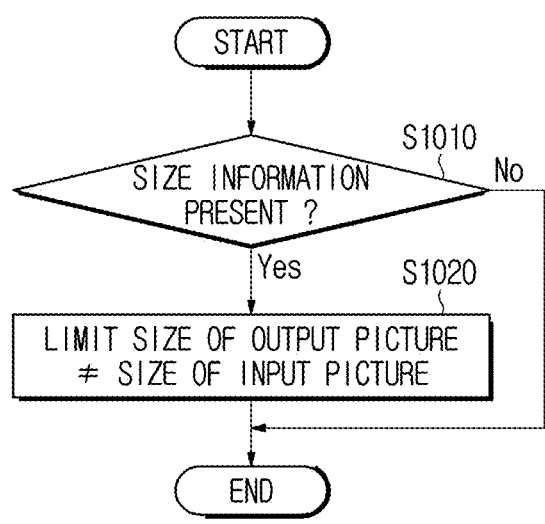
FIG. 10 is a flowchart illustrating an image decoding method according to another embodiment of the present disclosure.

FIG. 9 shows an example of an image encoding method that limits a width ratio and height ratio, and FIG. 10 shows an example of an image decoding method that limits the width ratio and height ratio.

Referring to FIG. 9, it may be determined whether the size of the output picture and the size of the input picture are equal to each other (S910). For example, it may be determined whether the width ratio is equal to 1 and whether the height ratio is equal to 1. As another example, it may be determined whether the width ratio is greater than 1 and whether the height ratio is greater than 1.

If the size of the output picture is not equal to the size of the input picture, the size information may be encoded in a bitstream (NNPFC SEI message) (S920). In contrast, if the size of the output picture is equal to the size of the input picture, the size information may not be encoded. For example, if the width ratio is not equal to 1 and the height ratio is not equal to 1, the size information is encoded, and if the width ratio is equal to 1 and the height ratio is equal to 1, the size information may not be encoded. As another example, if the width ratio is greater than 1 and the height ratio is greater than 1, the size information is encoded, and if the width ratio is less than or equal to 1 and the height ratio is less than or equal to 1, the size information may not be encoded.

Referring to FIG. 10, it may be determined whether size information is present (S1010). That is, it may be determined whether size information is obtained from a bitstream (NNPFC SEI message). Referring to Table 4 and Table 25, whether size information is present may have the same meaning as whether resolution upsampling is performed. That is, the size information being present may mean that resolution upsampling is performed ((nnpfc_purpose & 0x04)!=0), and the size information being not present may mean that resolution upsampling is not performed ((nnpfc_purpose & 0x04)==0).

When the size information is present, the size of the output picture may be constrained to have a different value than the size of the input picture. For example, the width ratio may be constrained to have a value not equal to 1, and the height ratio may be constrained to have a value not equal to 1. As another example, the width ratio may be constrained to have a value greater than 1, and the height ratio may be constrained to have a value greater than 1.

Figure 11:
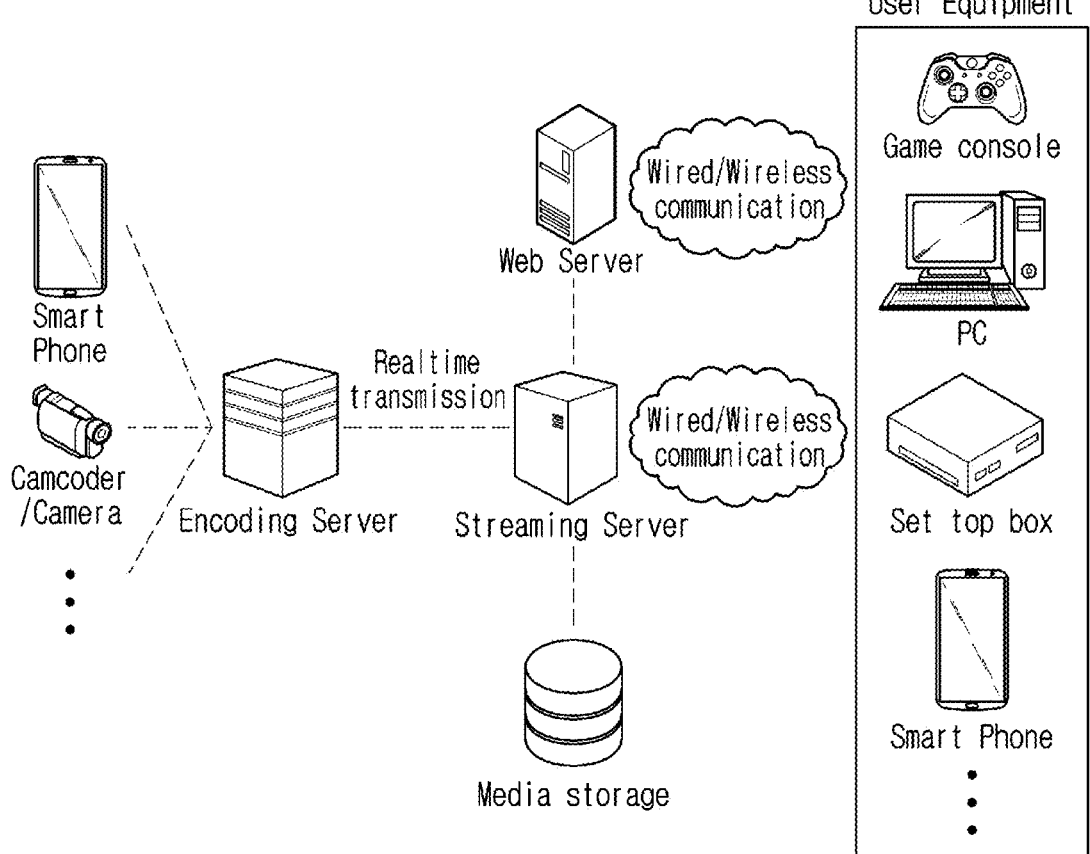
FIG. 11 is a view showing a content streaming system to which an embodiment of the present disclosure is applicable.

FIG. 11 is a view showing a content streaming system, to which an embodiment of the present disclosure is applicable.

As shown in FIG. 11, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

The embodiments of the present disclosure may be used to encode or decode an image.

What is claimed is:

1. A decoding apparatus for image decoding, the decoding apparatus comprising:
  a memory; and
  at least one processor connected to the memory, the at least one processor being configured to:
  obtain a neural-network post-filter characteristics (NNPFC) supplemental enhancement information (SEI) message, and
  perform post-filtering on an input picture to obtain an output picture based on the NNPFC SEI message,
  wherein the NNPFC SEI message includes ratio information for determining a size of the output picture,
  wherein the ratio information comprises numerator information and denominator information specifying a ratio of the size of the output picture relative to a size of the input picture,
  wherein first flag information is obtained based on NNPFC purpose information in the NNPFC SEI message, and
  wherein the ratio information is included in the NNPFC SEI message based on the first flag information being equal to 1, and the ratio information is not included in the NNPFC SEI message based on the first flag information being equal to 0.

2. The decoding apparatus of claim 1, wherein the numerator information includes first numerator information for a first ratio of a width of the output picture relative to a width of the input picture and second numerator information for a second ratio of a height of the output picture relative to a height of the input picture.

3. The decoding apparatus of claim 2, wherein the denominator information includes first denominator information for the first ratio and second denominator information for the second ratio.

4. The decoding apparatus of claim 2, wherein a numerator value for the first ratio is obtained by adding 1 to the first numerator information, and wherein a numerator value for the second ratio is obtained by adding 1 to the second numerator information.

5. The decoding apparatus of claim 3, wherein a denominator value for the first ratio is obtained by adding 1 to the first denominator information, and wherein a denominator value for the second ratio is obtained by adding 1 to the second denominator information.

6. The decoding apparatus of claim 1, wherein the ratio information is encoded based on 0-th order exponential Golomb coding.

7. The decoding apparatus of claim 2, wherein a width of the output picture is determined by rounding up a product of multiplying the width of the input picture by the first ratio.

8. The decoding apparatus of claim 2, wherein a height of the output picture is determined by rounding up product of multiplying the height of the input picture by the second ratio.

9. The decoding apparatus of claim 1, wherein the ratio of the size of the output picture relative to the size of the input picture specified by the ratio information is not equal to 1.

10. The decoding apparatus of claim 1, wherein specific size information of the output picture is included in the NNPFC SEI message based on the first flag information being equal to 0.

11. An encoding apparatus for image encoding, the encoding apparatus comprising:

a memory; and at least one processor connected to the memory, the at least one processor being configured to:

generate a neural-network post-filter characteristics (NNPFC) supplemental enhancement information (SEI) message, and encode image information including the NNPFC SEI message, wherein the NNPFC SEI message includes ratio information for determining a size of an output picture obtained from performing post-filtering on an input picture, wherein the ratio information comprises numerator information and denominator information specifying a ratio of the size of the output picture relative to a size of the input picture, wherein first flag information is obtained based on NNPFC purpose information in the NNPFC SEI message, and wherein the ratio information is included in the NNPFC SEI message based on the first flag information being equal to 1, and the ratio information is not included in the NNPFC SEI message based on the first flag information being equal to 0.

12. An apparatus for transmitting a bitstream, the apparatus comprising:

at least one processor configured to generate the bitstream including a neural-network post-filter characteristics (NNPFC) supplemental enhancement information (SEI) message; and a transmitter configured to transmit the bitstream, wherein the NNPFC SEI message includes ratio information for determining a size of an output picture obtained from performing post-filtering on an input picture, wherein the ratio information comprises numerator information and denominator information specifying a ratio of the size of the output picture relative to a size of the input picture, wherein first flag information is obtained based on NNPFC purpose information in the NNPFC SEI message, and wherein the ratio information is included in the NNPFC SEI message based on the first flag information being equal to 1, and the ratio information is not included in the NNPFC SEI message based on the first flag information being equal to 0.

* * * * *